(12) United States Patent
Ajito

(10) Patent No.: US 9,077,944 B2
(45) Date of Patent: Jul. 7, 2015

(54) IMAGE PICKUP DEVICE, IMAGE PROCESSING METHOD, AND STORAGE MEDIUM

(75) Inventor: Takeyuki Ajito, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 665 days.

(21) Appl. No.: 12/704,898

(22) Filed: Feb. 12, 2010

(65) Prior Publication Data

US 2010/0201840 A1   Aug. 12, 2010

(30) Foreign Application Priority Data

Feb. 12, 2009   (JP) .................................. 2009-30003

(51) Int. Cl.
*H04N 9/73*   (2006.01)
*H04N 5/222*   (2006.01)
*H04N 5/235*   (2006.01)

(52) U.S. Cl.
CPC ............. *H04N 9/735* (2013.01); *H04N 5/2354* (2013.01)

(58) Field of Classification Search
CPC ............................. H04N 9/735; H04N 5/2354
USPC ........ 348/223.1, 224.1, 225.1, 370–371, 242, 348/251, 254
See application file for complete search history.

(56) References Cited

U.S. PATENT DOCUMENTS

| | | | | |
|---|---|---|---|---|
| 5,568,187 A | * | 10/1996 | Okino | 348/224.1 |
| 6,535,245 B1 | * | 3/2003 | Yamamoto | 348/223.1 |
| 2002/0076219 A1 | * | 6/2002 | Uchino | 396/429 |
| 2005/0047771 A1 | * | 3/2005 | Yuyama | 396/155 |
| 2006/0056688 A1 | * | 3/2006 | Toyoda | 382/169 |

FOREIGN PATENT DOCUMENTS

| | | |
|---|---|---|
| JP | 2001-092955 | 4/2001 |
| JP | 2001-177732 | 6/2001 |
| JP | 2003-299109 | 10/2003 |
| WO | WO 2004/010711 A1 | 1/2004 |

* cited by examiner

*Primary Examiner* — Twyler Haskins
*Assistant Examiner* — Carramah J Quiett
(74) *Attorney, Agent, or Firm* — Scully, Scott, Murphy & Presser, P.C.

(57) ABSTRACT

A first WB correction coefficient for modifying a tint of an image captured in an auxiliary light non-emission condition to a tint of a peripheral light of the auxiliary light non-emission condition is set by a first WB correction coefficient setting unit, and a second WB correction coefficient for modifying the tint of an image captured in an auxiliary light emission condition to the tint of the auxiliary light non-emission condition is set by a second WB correction coefficient setting unit. The tint of the image captured in the auxiliary light emission condition is then modified to the tint of the auxiliary light non-emission condition by an image processing unit on the basis of the first WB correction coefficient and the second WB correction coefficient.

9 Claims, 16 Drawing Sheets

IMAGE PICKUP DEVICE, IMAGE PROCESSING METHOD, AND STORAGE MEDIUM

FIELD OF THE INVENTION

This invention relates to an image pickup device, an image processing method, and a storage medium.

BACKGROUND OF THE INVENTION

When image pickup is performed by a conventional digital camera in an environment such as a dark room, the image pickup operation is often performed by emitting auxiliary light (stroboscopic light or flash light) to compensate for underexposure. Further, as described in JP2001-177732A and JP2001-92955A, a typical digital camera includes a so-called white balance function. Moreover, JP2003-299109A discloses a method of detecting a tint of peripheral light prior to stroboscopic light emission and aligning the color of the stroboscopic light itself with the peripheral light.

SUMMARY OF THE INVENTION

An aspect of this invention is an image pickup device including an auxiliary light generation unit for emitting an auxiliary light during an image pickup operation. The image pickup device comprises an image acquisition unit for obtaining an image of an object, a light source characteristic acquisition unit for obtaining a light source characteristic of the image pickup operation, a first tint correction coefficient setting unit for setting, on the basis of the light source characteristic of an image pickup operation performed in an auxiliary light non-emission condition, a first tint correction coefficient for correcting a tint of an image captured in the auxiliary light non-emission condition to the tint of a peripheral light of the auxiliary light non-emission condition, a second tint correction coefficient setting unit for setting, on the basis of the light source characteristic of an image pickup operation performed in an auxiliary light emission condition, a second tint correction coefficient for correcting the tint of an image captured in the auxiliary light emission condition to the tint of the auxiliary light non-emission condition, and an image processing unit for generating an image having the tint of the auxiliary light non-emission condition on the basis of the first tint correction coefficient and the second tint correction coefficient when the image pickup operation is performed in the auxiliary light emission condition.

Another aspect of this invention is an image processing method for processing an image captured by emitting an auxiliary light during an image pickup operation. The image processing method comprises obtaining an image of an object, obtaining a light source characteristic of the image pickup operation, setting, on the basis of the light source characteristic of an image pickup operation performed in an auxiliary light non-emission condition, a first tint correction coefficient for correcting a tint of an image captured in the auxiliary light non-emission condition to the tint of a peripheral light of the auxiliary light non-emission condition, setting, on the basis of the light source characteristic of an image pickup operation performed in an auxiliary light emission condition, a second tint correction coefficient for correcting the tint of an image captured in the auxiliary light emission condition to the tint of the auxiliary light non-emission condition, and generating an image having the tint of the auxiliary light non-emission condition on the basis of the first tint correction coefficient and the second tint correction coefficient when the image pickup operation is performed in the auxiliary light emission condition.

A further aspect of this invention is a computer-readable storage medium storing a program executed by a computer. The program comprises an image acquisition step for obtaining an image of an object, a light source characteristic acquisition step for obtaining a light source characteristic of the image pickup operation, a first tint correction coefficient setting step for setting, on the basis of the light source characteristic of an image pickup operation performed in an auxiliary light non-emission condition, a first tint correction coefficient for correcting a tint of an image captured in the auxiliary light non-emission condition to the tint of a peripheral light of the auxiliary light non-emission condition, a second tint correction coefficient setting step for setting, on the basis of the light source characteristic of an image pickup operation performed in an auxiliary light emission condition, a second tint correction coefficient for correcting the tint of an image captured in the auxiliary light emission condition to the tint of the auxiliary light non-emission condition, and an image processing step for generating an image having the tint of the auxiliary light non-emission condition on the basis of the first tint correction coefficient and the second tint correction coefficient when the image pickup operation is performed in the auxiliary light emission condition.

DESCRIPTION OF THE PREFERRED EMBODIMENTS

Figure 1:
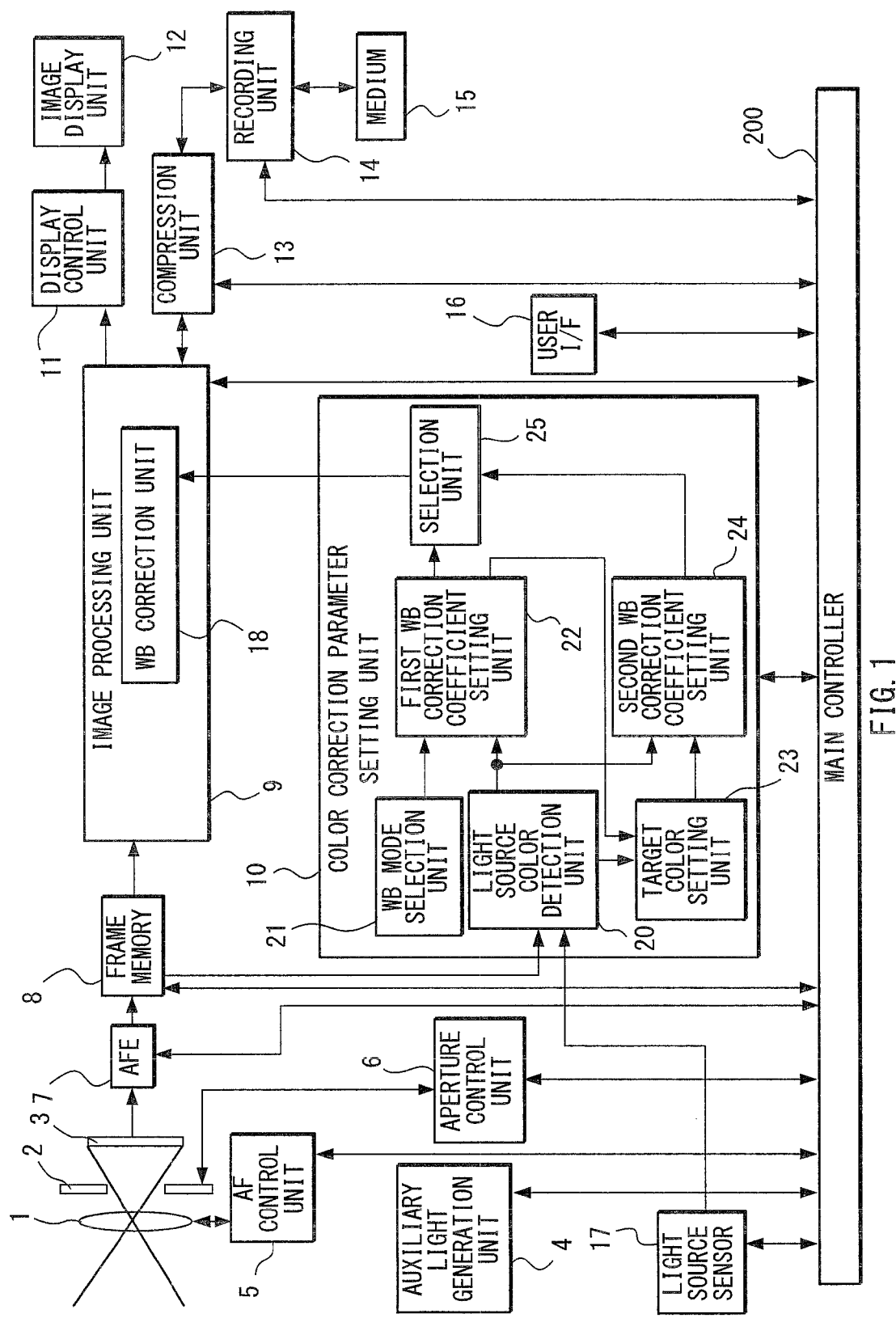
FIG. 1 is a block diagram of a camera according to a first embodiment of this invention.

A first embodiment of this invention will now be described using FIG. 1. FIG. 1 is a block diagram of a digital still camera (to be referred to hereafter as a camera) according to the first embodiment. Here, a digital still camera is described as an example, but any image pickup device that is capable of image pickup using auxiliary light (stroboscopic light emission) may be used.

The camera comprises a lens 1, a aperture 2, an imaging device (image acquisition unit) 3, an auxiliary light generation unit 4, an AF control unit 5, a aperture control unit 6, an AFE (Analog Front End circuit) 7, a frame memory 8, an image processing unit 9, a color correction parameter setting unit 10, a display control unit 11, an image display unit 12, a compression unit 13, a recording unit 14, a medium 15, a user I/F 16, and a light source sensor 17. The camera further comprises a main controller 200 for controlling various functions of the camera.

The lens 1 is moved along an optical axis by an actuator, not shown in the figure, during a focus operation on the basis of a signal from the AF control unit 5.

The opening size of the aperture 2 is adjusted by an actuator, not shown in the figure, on the basis of a signal from the aperture control unit 6 to adjust an amount of light reaching a light-receiving surface of the imaging device 3 per unit time.

The imaging device 3 outputs an electric signal corresponding to the light incident on the light-receiving surface at a predetermined timing. The imaging device 3 may be constituted by a sensor such as a CCD (Charge-Coupled Device) or a CMOS (Complementary Metal Oxide Sensor), for example, or by various other types of imaging device.

The lens 1, aperture 2, and imaging device 3 are disposed on the optical axis.

The auxiliary light generation unit 4 generates auxiliary light in the direction of an object during image pickup in accordance with a user operation or a set program.

The AF control unit 5, aperture control unit 6, and auxiliary light generation unit 4 are connected to the main controller 200. A position of the lens 1, an aperture value, emission/non-emission of auxiliary light during image pickup, and so on are controlled on the basis of control signals transmitted from the main controller 200.

The AFE 7 digitizes an object image incident on the imaging device 3. A digitized image signal is stored in the frame memory 8 as image data.

The image processing unit 9 includes a white balance correction unit 18. Hereafter, "white balance" will be abbreviated to "WB". The WB correction unit 18 modifies a tint of an image by implementing WB correction on the image data stored in the frame memory 8 using first WB correction coefficients (first tint correction coefficients) $G_r^1$, $G_b^1$ or second WB correction coefficients (second tint correction coefficients) $G_r^2$, $G_b^2$, as will be described in detail below. As a result, image data obtained through image pickup performed in an auxiliary light emission condition can be converted into image data having a tint corresponding to an auxiliary light non-emission condition. In other words, an image having a tint that corresponds to an auxiliary light non-emission condition can be generated even when image pickup is performed by emitting auxiliary light.

The image processing unit 9 may also correct the image data using other image processing means, not shown in the figure. It should be noted that the superscript characters "1", "2" following G are suffixes.

The compression unit 13 compresses image data transferred from the image processing unit 9. The compressed image data are recorded in the medium 15, which can be attached to and detached from the camera, via the recording unit 14.

The image display unit 12 displays an image of the object on the basis of image data transferred from the image processing unit 9 via the display control unit 11. The image display unit 12 is capable of displaying an image captured by the imaging device 3 in real time. By displaying the image in real time, the condition of the object can be viewed, and therefore the image display unit 12 can be used in place of a finder. The image display unit 12 is also capable of displaying an image recorded in the medium 15.

The user I/F 16 includes a power switch, a shutter button, and an interface for switching between various modes during image pickup.

The light source sensor 17 senses peripheral environmental light in other words a luminance, a color characteristic, or a spectral characteristic of the peripheral light, during image pickup.

The color correction parameter setting unit 10 comprises a light source color detection unit (light source characteristic acquisition unit) 20, a WB mode selection unit 21, a first WB correction coefficient setting unit (first tint correction coefficient setting unit) 22, a target color setting unit 23, a second WB correction coefficient setting unit (second tint correction coefficient setting unit) 24, and a selection unit 25.

The light source color detection unit 20 detects chromaticity values (light source characteristics) $w_{r/g}^S$, $w_{b/g}^S$, $w_{r/g}^F$, and $w_{b/g}^F$ relating to a light source color of the peripheral light during image pickup on the basis of a signal obtained from the light source sensor 17 or the image data stored in the frame memory 8. The superscript characters "S" and "F" following w are suffixes.

The WB mode selection unit 21 selects a light source color selected by a user via the user I/F 16, and calculates the chromaticity values $w_{r/g}^S$, $w_{b/g}^S$ of the light source color.

The first WB correction coefficient setting unit 22 sets the first WB correction coefficients $G_r^1$, $G_b^1$ for aligning the tint of an image captured in the auxiliary light non-emission condition with the tint of the peripheral light. The first WB correction coefficient setting unit 22 sets the first WB correction coefficients $G_r^1$, $G_b^1$ in accordance with a light source type corresponding to the light source color of the peripheral light detected by the light source color detection unit 20 or the light source color selected by the WB mode selection unit 21 via the user I/F 16. When the light source color is selected by the user via the WB mode selection unit 21, the first WB correction coefficients $G_r^1$, $G_b^1$ are set on the basis of the light source color selected by the WB mode selection unit 21 rather than the light source color detected by the light source color detection unit 20.

The target color setting unit 23 sets target colors $w_{r/g}^O$, $w_{b/g}^O$ of an achromatic object in the auxiliary light non-emission condition on the basis of the first WB correction coefficients $G_r^1$, $G_b^1$ set by the first WB correction coefficient setting unit 22 in the auxiliary light non-emission condition and the light source colors $w_{r/g}^F$, $w_{b/g}^F$ detected by the light source color detection unit 20 in the auxiliary light non-emission condition.

The second WB correction coefficient setting unit 24 sets the second WB correction coefficients $G_r^2$, $G_b^2$ for aligning the tint of an image captured in the auxiliary light emission condition with the tint of the auxiliary light non-emission condition on the basis of the target colors $w_{r/g}^O$, $w_{b/g}^O$ of the achromatic object in the auxiliary light non-emission condition, set by the target color setting unit 23, and the light source colors $w_{r/g}^F$, $w_{b/g}^F$ detected by the light source color detection unit 20 in the auxiliary light emission condition.

The selection unit 25 selects a WB correction coefficient to be applied to the image data by the WB correction unit 18 during WB correction. When auxiliary light is not emitted by the auxiliary light generation unit 4, the selection unit 25 selects the first WB correction coefficients $G_r^1$, $G_b^1$, and when auxiliary light is emitted by the auxiliary light generation unit 4, the selection unit 25 selects the second WB correction coefficients $G_r^2$, $G_b^2$.

The main controller 200 is connected to the AFE 7, the frame memory 8, the image processing unit 9, the color correction parameter setting unit 10, the compression unit 13, the recording unit 14, the user I/F unit 16, and the light source sensor 17. The main controller 200 controls operations of the respective units to which it is connected. It should be noted that a CPU provided in the main controller 200 executes calculation processing on the basis of a program stored in a memory or the like, thereby the image processing unit 9, the color correction parameter setting unit 10, and so on may be operated.

According to the constitution described above, the second WB correction coefficient setting unit 24 sets the second WB correction coefficients $G_r^2$, $G_b^2$, and the WB correction unit 18 performs WB correction on image data obtained through image pickup in the auxiliary light emission condition using the second WB correction coefficients $G_r^2$, $G_b^2$. Hence, even when image pickup is performed by emitting auxiliary light, an image having the tint of the auxiliary light non-emission condition can be obtained, and as a result, color reproduction can be performed such that a peripheral atmosphere remains.

Figure 2:
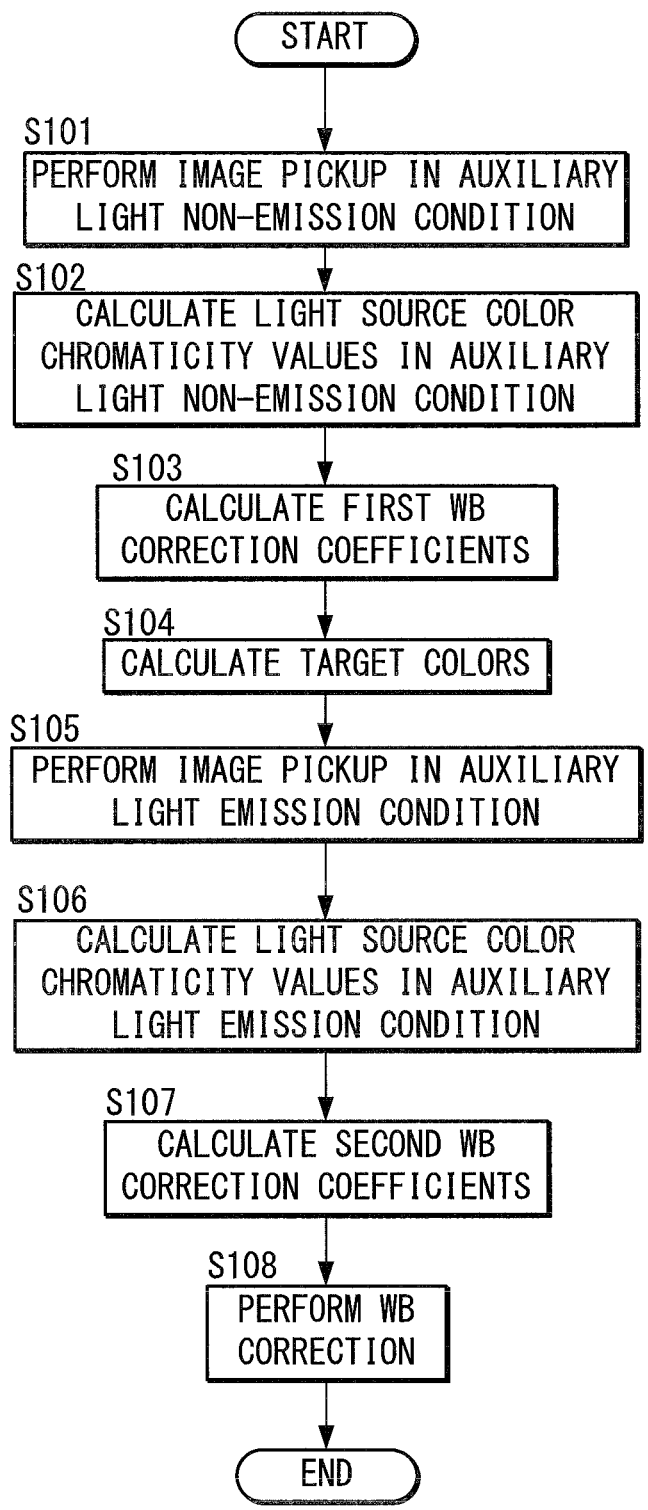
FIG. 2 is a flowchart illustrating WB correction according to the first embodiment of this invention.

Next, WB correction according to the first embodiment will be described using a flowchart shown in FIG. 2.

In a step S101, image pickup is performed in the auxiliary light non-emission condition, in which light is not emitted by the auxiliary light generation unit 4, and image data obtained as a result are stored in the frame memory 8.

In a step S102, the light source color chromaticity values $w_{r/g}^S$, $w_{b/g}^S$ of the peripheral light in the auxiliary light non-emission condition are detected. The light source color chromaticity values $w_{r/g}^S$, $w_{b/g}^S$ of the peripheral light are detected using a signal from the light source sensor 17 or the image captured in the auxiliary light non-emission condition.

When detection is performed using a captured image, N pixel values (Ri, Gi, Bi) assumed to be achromatic colors are extracted from the image data stored in the frame memory 8. The light source color chromaticity values $w_{r/g}^S$, $w_{b/g}^S$ are then calculated by obtaining an average value of the N pixel values on the basis of Equation (1).

$$w_{r/g}^S = \frac{1}{N}\sum_{i=0}^{N}(R_i/G_i)$$

$$w_{b/g}^S = \frac{1}{N}\sum_{i=0}^{N}(B_i/G_i)$$

Equation (1)

In a step S103, the first WB correction coefficients $G_r^1$, $G_b^1$ are calculated using Equation (2) on the basis of the light source color chromaticity values $w_{r/g}^S$, $w_{b/g}^S$ determined in the step S102.

$$G_r^1 = 1/[\alpha \cdot w_{r/g}^n - (1-\alpha)w_{r/g}^S]$$

$$G_b^1 = 1/[\alpha \cdot w_{b/g}^n - (1-\alpha)w_{b/g}^S]$$

$$\alpha = \begin{cases} 0 & \text{if } D_w < D_{TH} \\ (D_w - D_{TH})/D_w & \text{if } D_w \geq D_{TH} \end{cases}$$

Equation (2)

$$D_w = (w_{r/g}^n - w_{r/g}^S)^2 + (w_{b/g}^n - w_{b/g}^S)^2$$

The superscript character "n" following w is a suffix, and chromaticity values $w_{r/g}^n$, $w_{b/g}^n$ indicate light source color chromaticity values of a predetermined standard light source (sunlight, for example). $D_{TH}$ is a value set during design, by which the light source color chromaticity values detected in the auxiliary light non-emission condition may be determined to have deviated from the light source color chromaticity values of the predetermined standard light source.

Thus, even when the light source color chromaticity values $w_{r/g}^S$, $w_{b/g}^S$ of the peripheral light in the auxiliary light non-emission condition deviate from the light source color chromaticity values $w_{r/g}^n$, $w_{b/g}^n$ of the standard light source, the first WB correction coefficients $G_r^1$, $G_b^1$ can be determined such that the tint of the light source remains to a certain extent.

It should be noted that the first WB correction coefficients $G_r^1$, $G_b^1$ may be set manually by the user via the user I/F 16 irrespective of the light source color detected by the light source color detection unit 20. In this case, the first WB correction coefficients $G_r^1$, $G_b^1$ are set on the basis of a mode selected by the user. Further, the image resulting from image pickup in the auxiliary light non-emission condition may be corrected using the first WB correction coefficients $G_r^1$, $G_b^1$ and then checked on the image display unit 12, whereupon the WB mode is reselected and the first WB correction coefficients $G_r^1$, $G_b^1$ are reset.

In a step S104, the target colors $w_{r/g}^O$, $w_{b/g}^O$ of an achromatic object following WB correction in the auxiliary light non-emission condition are calculated on the basis of the light source color chromaticity values $W_{r/g}^S$, $W_{b/g}^S$ of the peripheral light in the auxiliary light non-emission condition and the first WB correction coefficients $G_r^1$, $G_b^1$, as shown in Equation (3). The calculated target colors $w_{r/g}^O$, $w_{b/g}^O$ are then stored.

$$w_{r/g}^O = w_{r/g}^S \cdot G_r^1$$

$$w_{b/g}^O = w_{b/g}^S \cdot G_b^1$$

Equation (3)

It should be noted that when the light source color chromaticity values $w_{r/g}^S$, $w_{b/g}^S$ detected in the auxiliary light non-emission condition do not exceed the light source color chromaticity values $w_{r/g}^n$, $w_{b/g}^n$ of the predetermined standard light source by at least $D_{TH}$, all of the target colors $w_{r/g}^O$, $w_{b/g}^O$ are stored as 1, or in other words the achromatic color white. On the other hand, when the light source color chromaticity values $w_{r/g}^S$, $w_{b/g}^S$ detected in the auxiliary light non-emission condition exceed the light source color chromaticity values $w_{r/g}^n$, $w_{b/g}^n$ of the predetermined standard light source by at least $D_{TH}$, the target colors $w_{r/g}^O$, $w_{b/g}^O$ are stored as a value other than 1, or in other words as a chromatic color other than white.

In a step S105, main image pickup is performed by emitting auxiliary light. Image data obtained as a result are stored in the frame memory 8.

In a step S106, the light source color chromaticity values $w_{r/g}^F$, $w_{b/g}^F$ of the auxiliary light emission condition are detected on the basis of a signal output by the light source sensor 17 in the auxiliary light emission condition or the image data obtained in the main image pickup operation. The light source color chromaticity values $w_{r/g}^F$, $w_{b/g}^F$ may be detected using a similar method to the method of detecting the light source color chromaticity values $w_{r/g}^S$, $w_{b/g}^S$ of the auxiliary light non-emission condition.

In a step S107, the second WB correction coefficients $G_r^2$, $G_b^2$ for converting the tint of the image captured in the auxiliary light non-emission condition into the tint of the auxiliary light non-emission condition are calculated using Equation (4) on the basis of the target colors $w_{r/g}^O$, $w_{b/g}^O$ and the light source color chromaticity values $w_{r/g}^F$, $w_{b/g}^F$ detected in the step S106.

$$G_r^2 = w_{r/g}^O / w_{r/g}^F$$

$$G_b^2 = w_{b/g}^O / w_{b/g}^F \quad \text{Equation (4)}$$

In a step S108, WB correction is performed on the image data obtained through image pickup in the auxiliary light emission condition on the basis of the second WB correction coefficients $G_r^2$, $G_b^2$. As a result, the tint of the image captured by emitting auxiliary light can be converted into the tint prior to auxiliary light emission, and therefore color reproduction can be performed such that the peripheral atmosphere remains even when image pickup is performed by emitting auxiliary light.

Effects of the first embodiment of this invention will now be described.

The light source color chromaticity values $w_{r/g}^S$, $w_{b/g}^S$ of the auxiliary light non-emission condition are calculated, whereupon the first WB correction coefficients $G_r^1$, $G_b^1$ for correcting the tint of the image captured in the auxiliary light non-emission condition to the tint of the peripheral light are calculated. The target colors $w_{r/g}^O$, $w_{b/g}^O$ of an achromatic object in the auxiliary light non-emission condition are then set on the basis of the light source color chromaticity values $w_{r/g}^S$, $w_{b/g}^S$ of the auxiliary light non-emission condition and the first WB correction coefficients $G_r^1$, $G_b^1$. Further, the light source color chromaticity values $w_{r/g}^F$, $w_{b/g}^F$ of the auxiliary light emission condition are calculated. The second WB correction coefficients $G_r^2$, $G_b^2$ are then calculated on the basis of the target colors $w_{r/g}^O$, $w_{b/g}^O$ and the light source color chromaticity values $w_{r/g}^F$, $w_{b/g}^F$ of the auxiliary light emission condition, whereupon WB correction is performed on the image data captured in the auxiliary light emission condition on the basis of the second WB correction coefficients $G_r^2$, $G_b^2$. Thus, the tint of an image obtained through image pickup in which auxiliary light is emitted by the auxiliary light generation unit 4 can be aligned with the tint of an auxiliary light non-emission condition without increasing the size of the camera.

Figure 3:
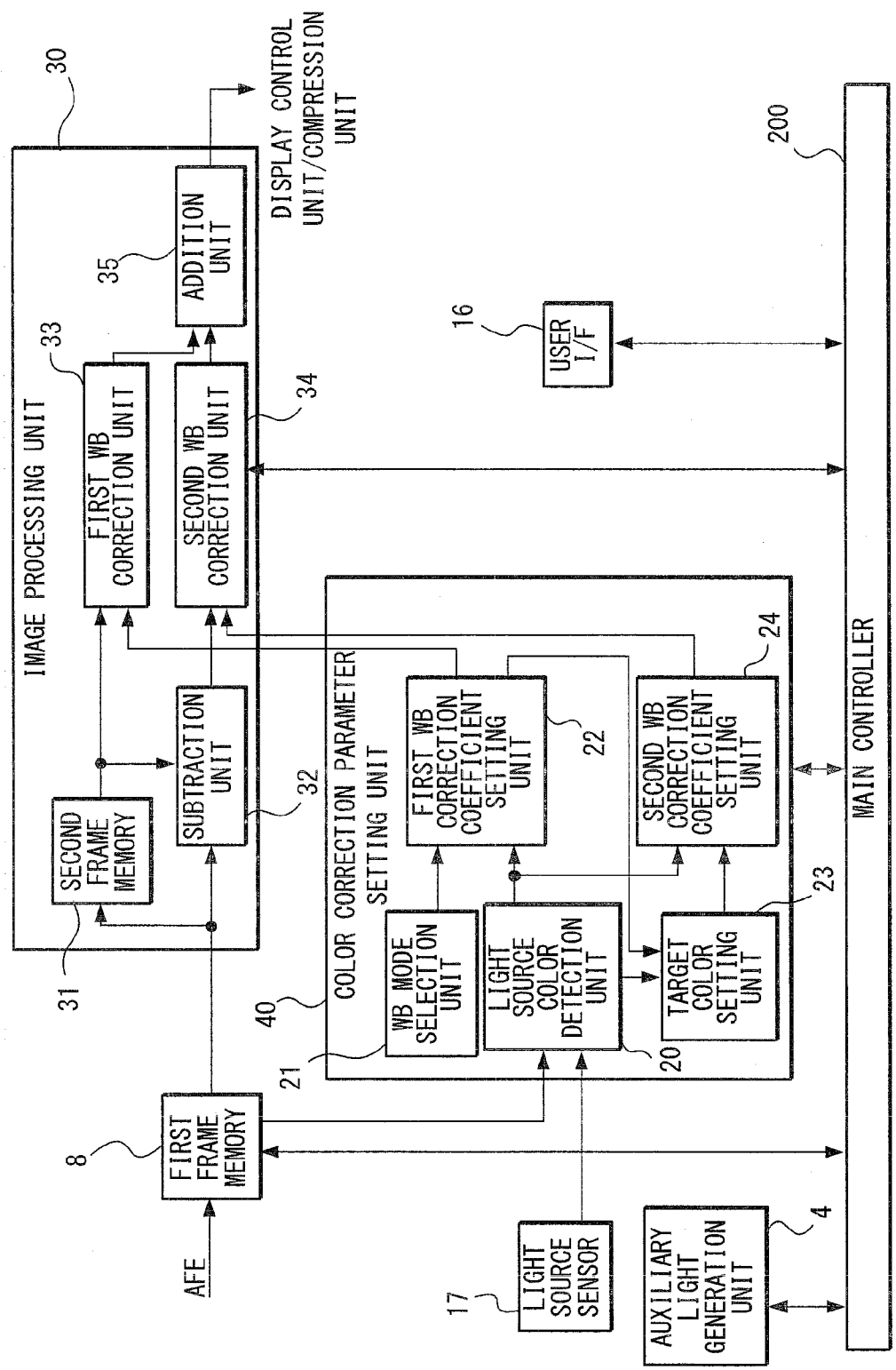
FIG. 3 is a block diagram showing a part of a camera according to a second embodiment of this invention.

Next, a second embodiment of this invention will be described using FIG. 3. FIG. 3 is a partial block diagram of a camera according to the second embodiment. The second embodiment differs from the first embodiment in the constitution of an image processing unit 30 and a color correction parameter setting unit 40. Further, in the second embodiment, the frame memory 8 of the first embodiment will be referred to as the first frame memory 8 for ease of description. All other constitutions are identical to the first embodiment, and therefore description thereof has been omitted. It should be noted that in the second embodiment, objects having identical constitutions to their counterparts in the first embodiment have been allocated identical reference numerals.

The image processing unit 30 comprises a second frame memory 31, a subtraction unit 32, a first WB correction unit 33, a second WB correction unit 34, and an addition unit 35.

The second frame memory 31 stores image data obtained through image pickup in the auxiliary light non-emission condition.

The subtraction unit 32 calculates, for each pixel, a difference value between the image data obtained through image pickup in the auxiliary light emission condition and stored in the first frame memory 8 and image data obtained in the auxiliary light non-emission condition and stored in the second frame memory 31. When image pickup is performed by emitting auxiliary light, a part in which the tint varies after being reached by the auxiliary light can be specified by calculating a chromaticity value that varies in accordance with auxiliary light emission for each pixel.

The first WB correction unit 33 performs first WB correction by applying the first WB correction coefficients $G_r^1$, $G_b^1$ set by the first WB correction coefficient setting unit 22 to the image data obtained in the auxiliary light non-emission condition and stored in the second frame memory 31.

The second WB correction unit 34 performs second WB correction by applying the second WB correction coefficients $G_r^2$, $G_b^2$ calculated by the second WB correction coefficient setting unit 24 to the difference value calculated by the subtraction unit 32.

The addition unit 35 adds the difference value subjected to second WB correction by the second WB correction unit 34 to the image data subjected to first WB correction by the first WB correction unit 33.

Figure 4:
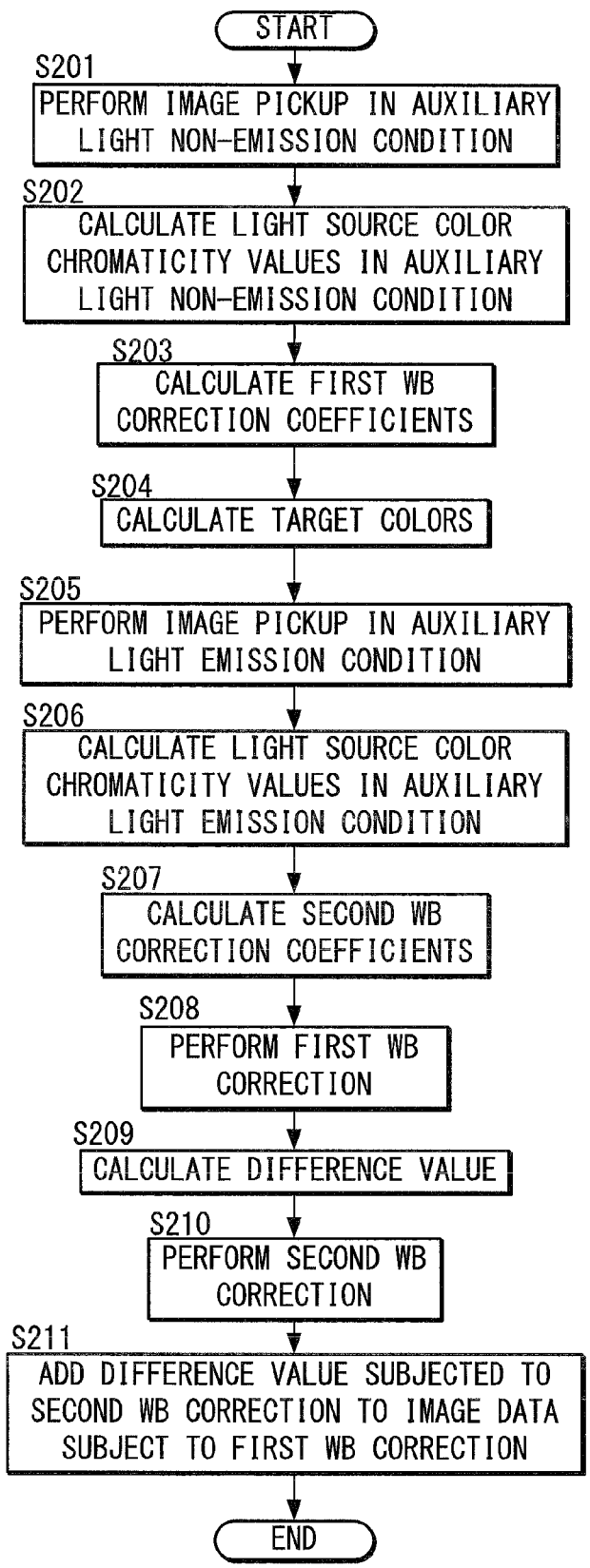
FIG. 4 is a flowchart illustrating WB correction according to the second embodiment of this invention.

Next, WB correction according to the second embodiment will be described using a flowchart shown in FIG. 4.

In a step S201, image pickup is performed in the auxiliary light non-emission condition, and image data obtained as a result are stored in the first frame memory 8 and the second frame memory 31.

Steps S202 to S204 are identical to the steps S102 to S104 of the first embodiment, and therefore description thereof is omitted. As a result, the first WB correction coefficients $G_r^1$, $G_b^1$ and the target colors $w_{r/g}^O$, $w_{b/g}^O$ an achromatic object following WB correction in the auxiliary light non-emission condition are calculated.

In a step S205, main image pickup is performed by emitting auxiliary light. Image data obtained as a result are stored in the frame memory 8.

Steps S206 and S207 are identical to the steps S106 and S107 of the first embodiment, and therefore description thereof is omitted. As a result, the second WB correction coefficients $G_r^2$, $G_b^2$ are calculated.

In a step S208, first WB correction is performed by applying the first WB correction coefficients $G_r^1$, $G_b^1$ to the image data obtained through image pickup in the auxiliary light non-emission condition and stored in the second frame memory 31.

In a step S209, the difference value between the image data obtained through image pickup in the auxiliary light emission condition and stored in the first frame memory 8 and the image data obtained through image pickup in the auxiliary light non-emission condition and stored in the second frame memory 31 is calculated.

In a step S210, second WB correction is performed by applying the second WB correction coefficients $G_r^2$, $G_b^2$ to the calculated difference value.

In a step S211, the difference value subjected to second WB correction is added to the image data subjected to first WB correction.

It should be noted that a positioning unit may be provided in front of the subtraction unit 32. The positioning unit performs image positioning when the object in the image data obtained in the auxiliary light emission condition deviates from the object in the image data obtained in the auxiliary light non-emission condition.

Effects of the second embodiment of this invention will now be described.

An image captured by having the auxiliary light generating unit 4 emit auxiliary light may include a part that is reached by the auxiliary light and a part that is not reached by the auxiliary light. In this case, the second WB correction is performed on the part that is reached by the auxiliary light by applying the second WB correction coefficients $G_r^2$, $G_b^2$ to the difference value serving as a difference component between the auxiliary light emission condition and the auxiliary light non-emission condition. The image data subjected to the first WB correction are then added to the difference value subjected to the second WB correction, and as a result, WB correction can be performed in accordance with the reach of the auxiliary light. Hence, when a part that is reached by the auxiliary light and a part that is not reached by the auxiliary light coexist, it is possible to align the tint of the image captured in the auxiliary light emission condition precisely with the tint of the auxiliary light non-emission condition only in the part reached by the auxiliary light, and as a result, color reproduction can be performed precisely in each region of the image.

Figure 5:
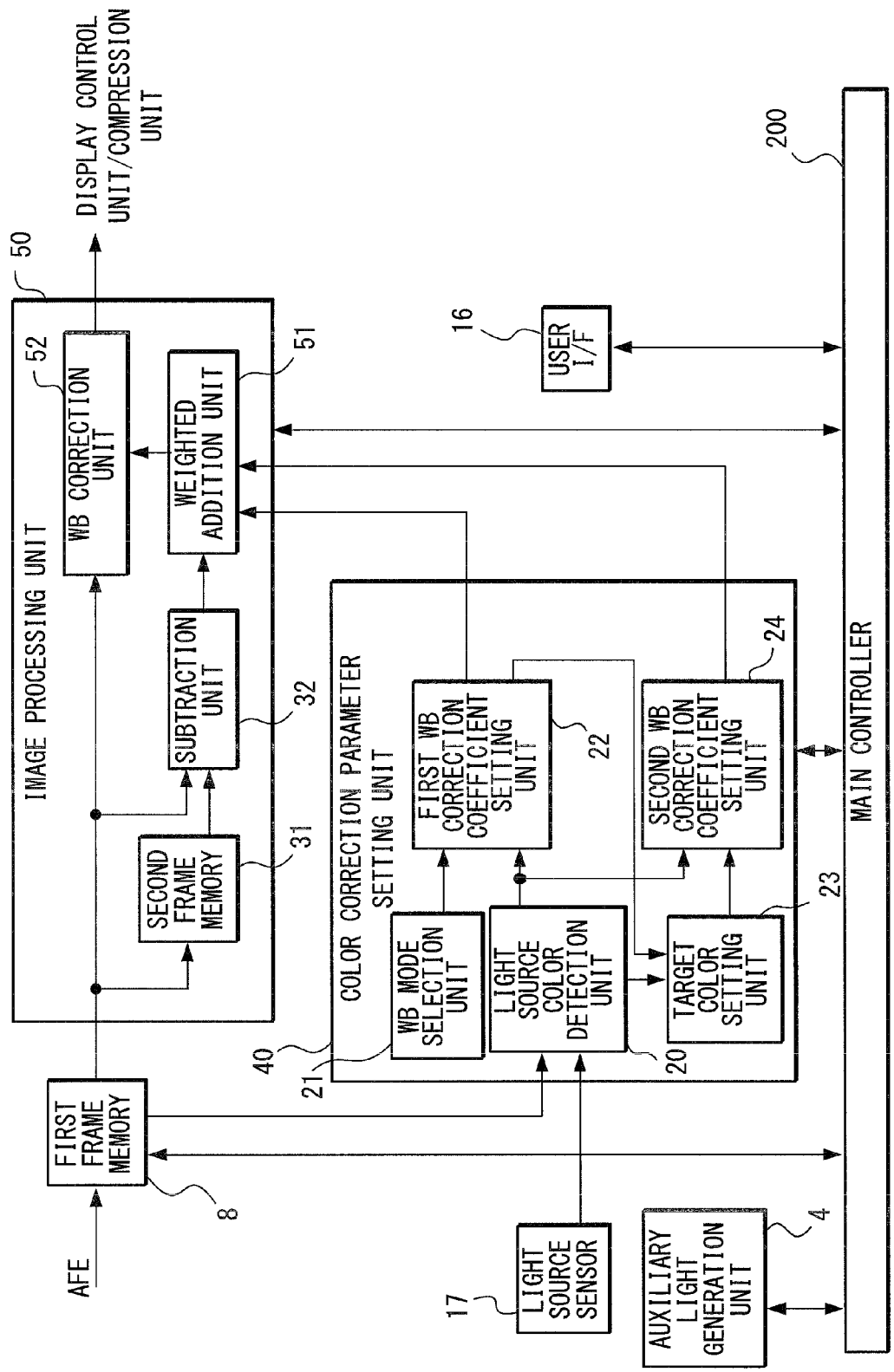
FIG. 5 is a block diagram showing a part of a camera according to a third embodiment of this invention.

Next, a third embodiment of this invention will be described using FIG. 5. FIG. 5 is a partial block diagram of a camera according to the third embodiment. The third embodiment differs from the second embodiment in the constitution of an image processing unit 50. All other constitutions are identical to the second embodiment, and therefore description thereof has been omitted.

The image processing unit 50 comprises the second frame memory 31, the subtraction unit 32, a weighted addition unit (weighting unit) 51, and a WB correction unit 52.

The weighted addition unit 51 calculates third WB correction coefficients $G_r^3$, $G_b^3$ by weighting the first WB correction coefficients $G_r^1$, $G_b^1$ calculated by the first WB correction coefficient setting unit 22 and the second WB correction coefficients $G_r^2$, $G_b^2$ calculated by the second WB correction coefficient setting unit 24 for each pixel in accordance with the difference value obtained from the subtraction unit 32.

Weighting is performed by modifying a ratio between the first WB correction coefficients $G_r^1$, $G_b^1$ and the second WB correction coefficients $G_r^2$, $G_b^2$ for each pixel on the basis of the difference value calculated by the subtraction unit 32. For example, when the difference value is large, or in other words when the difference between the chromaticity values of the image data obtained in the auxiliary light emission condition and the image data obtained in the auxiliary light non-emission condition is large, the second WB correction coefficients $G_r^2$, $G_b^2$ are weighted relative to the first WB correction coefficients $G_r^1$, $G_b^1$. In this case, the WB correction unit 52 performs WB correction such that the effect of the second WB correction coefficients $G_r^2$, $G_b^2$ is greater.

The WB correction unit 52 performs WB correction by applying the weighted third WB correction coefficients to the image data obtained through image pickup in the auxiliary light emission condition and stored in the first frame memory 8.

Figure 6:
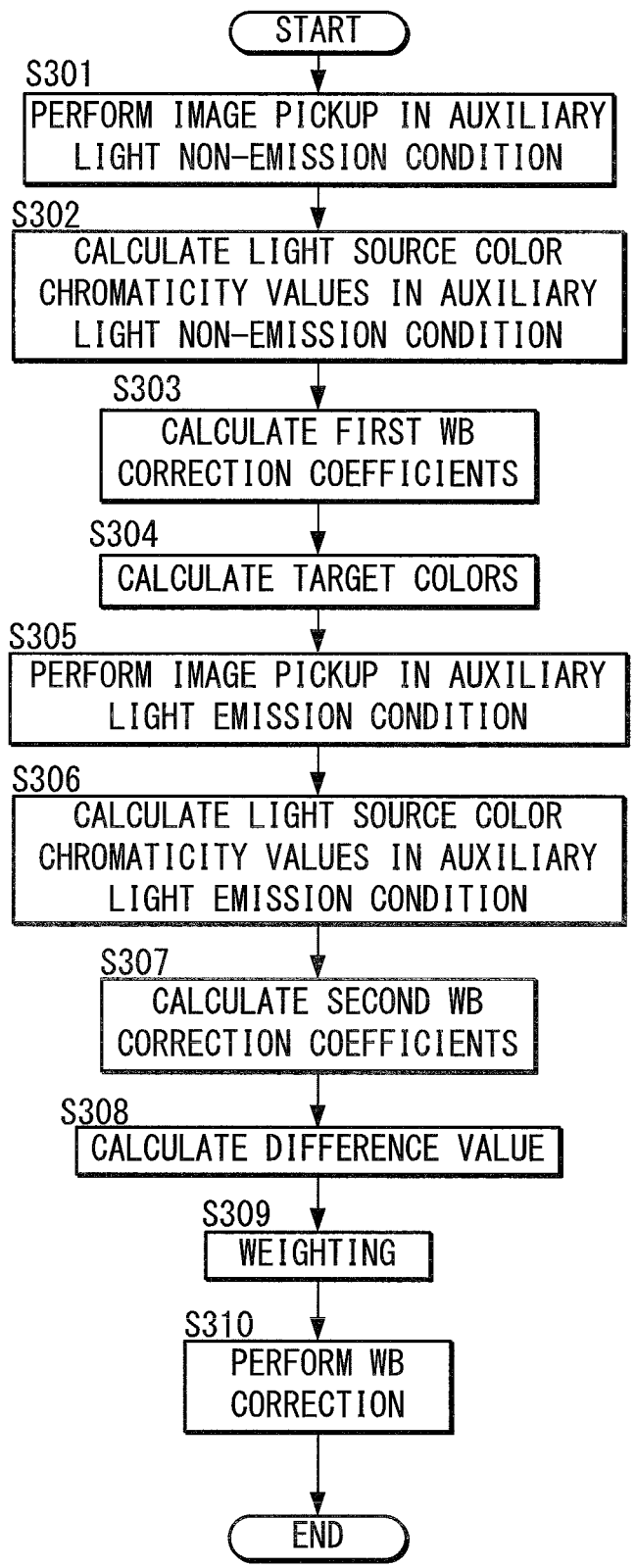
FIG. 6 is a flowchart illustrating WB correction according to the third embodiment of this invention.

Next, WB correction according to the third embodiment will be described using a flowchart shown in FIG. 6.

Steps S301 to S307 are identical to the steps S201 to S207 of the second embodiment, and therefore description thereof is omitted. As a result, the first WB correction coefficients $G_r^1$, $G_b^1$, the target colors $w_{r/g}^O$, $w_{b/g}^O$ the achromatic object following WB correction in the auxiliary light non-emission condition, and the second WB correction coefficients $G_r^2$, $G_b^2$ are calculated.

In a step S308, the difference value between the image data obtained through image pickup in the auxiliary light emission condition and stored in the first frame memory 8 and the image data obtained through image pickup in the auxiliary light non-emission condition and stored in the second frame memory 31 is calculated.

In a step S309, the ratio between the first WB correction coefficients $G_r^1$, $G_b^1$ and the second WB correction coefficients $G_r^2$, $G_b^2$ is set for each pixel on the basis of the calculated difference value, whereupon the third WB correction coefficients $G_r^3$, $G_b^3$ are calculated by weighting the first WB correction coefficients $G_r^1$, $G_b^1$ and second WB correction coefficients $G_r^2$, $G_b^2$.

In a step S310, WB correction is performed on the image data obtained through image pickup in the auxiliary light emission condition and stored in the first frame memory 8 on the basis of the third WB correction coefficients $G_r^3$, $G_b^3$.

Effects of the third embodiment of this invention will now be described.

Similarly to the second embodiment, when an image includes a part that is reached by the auxiliary light and a part that is not reached by the auxiliary light, WB correction is performed using the third WB correction coefficients $G_r^3$, $G_b^3$, which are calculated by varying the ratio between the first WB correction coefficients $G_r^1$, $G_b^1$ and the second WB correction coefficients $G_r^2$, $G_b^2$ for each pixel in accordance with the difference value, and as a result, tint conversion from the auxiliary light emission condition to the auxiliary light non-emission condition can be applied to the part that is reached by the auxiliary light. Moreover, in contrast to the second embodiment, synthesis of a plurality of captured images is not performed in the third embodiment, and therefore positional deviation is unlikely to have an effect.

Figure 7:
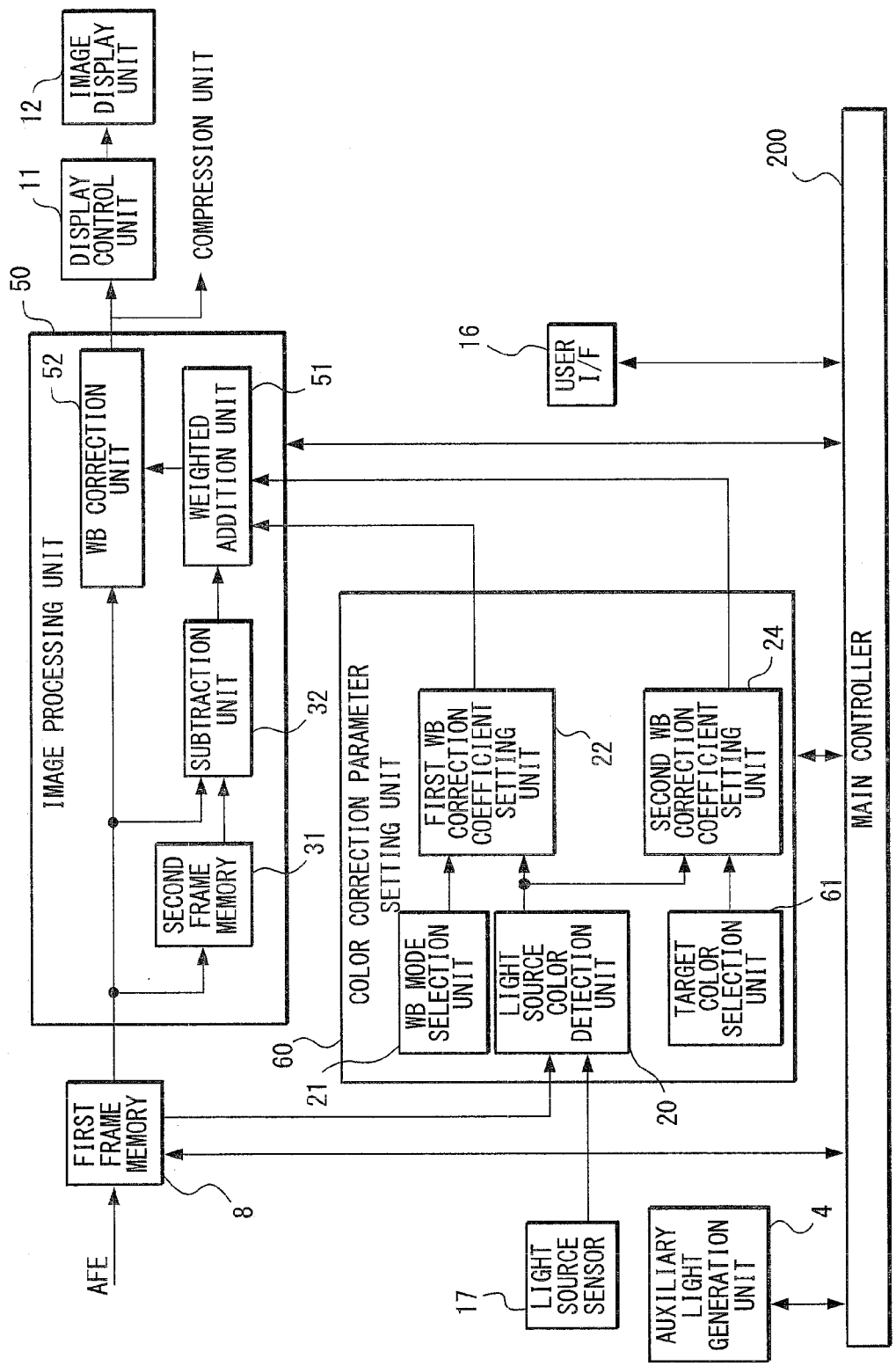
FIG. 7 is a block diagram showing a part of a camera according to a fourth embodiment of this invention.

Next, a fourth embodiment of this invention will be described using FIG. 7. FIG. 7 is a partial block diagram of a camera according to the fourth embodiment. The fourth embodiment differs from the third embodiment in the constitution of a color correction parameter setting unit 60. All other constitutions are identical to the third embodiment, and therefore description thereof has been omitted.

The color correction parameter setting unit 60 comprises the light source color detection unit 20, the WB mode selection unit 21, the first WB correction coefficient setting unit 22, a target color selection unit 61, and the second WB correction coefficient setting unit 24.

Figure 8A:
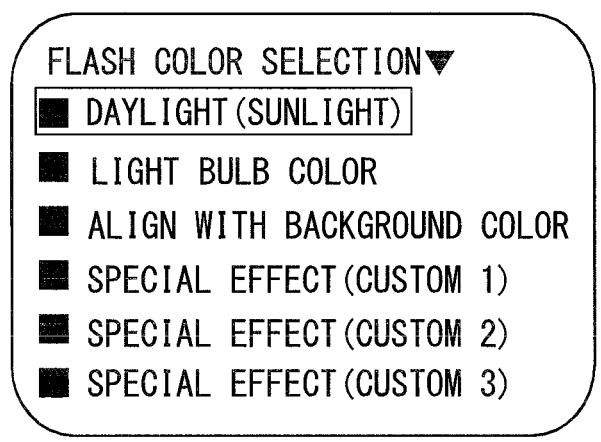
FIG. 8A is a view showing an example of an image for setting a target color.
Figure 8B:
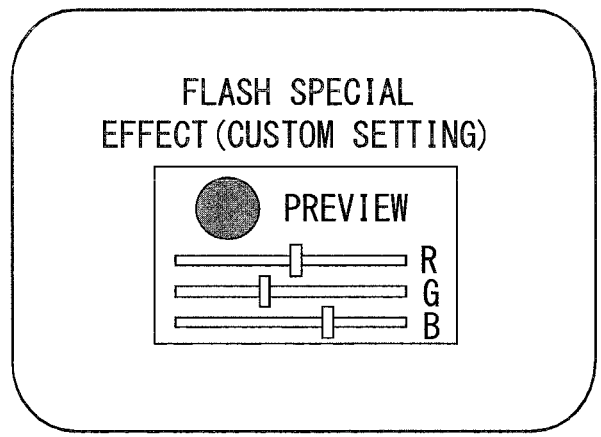
FIG. 8B is a view showing an example of an image for setting a target color.

The target color selection unit 61 selects the target colors $w_{r/g}^O$, $w_{b/g}^O$ in accordance with a color setting of the auxiliary light generation unit 4 selected by the user via the user I/F 16. By selecting the target colors $w_{r/g}^O$, $w_{b/g}^O$ in accordance with a user instruction, the user can modify the color of the auxiliary light (more accurately, the color of an image of an object on which the auxiliary light impinges) freely. When the user selects the color of the auxiliary light, images such as those shown in FIGS. 8A and 8B are displayed on the image display unit 12. The user can set a color type or a color value of the auxiliary light while viewing the displayed images.

When an "align with background color" mode is selected in FIG. 8A, the target colors $w_{r/g}^O$, $w_{b/g}^O$ may be set on the basis of a detection result of the light source color in the auxiliary light non-emission condition using a constitution such as that of the third embodiment shown in FIG. 5.

Figure 9:
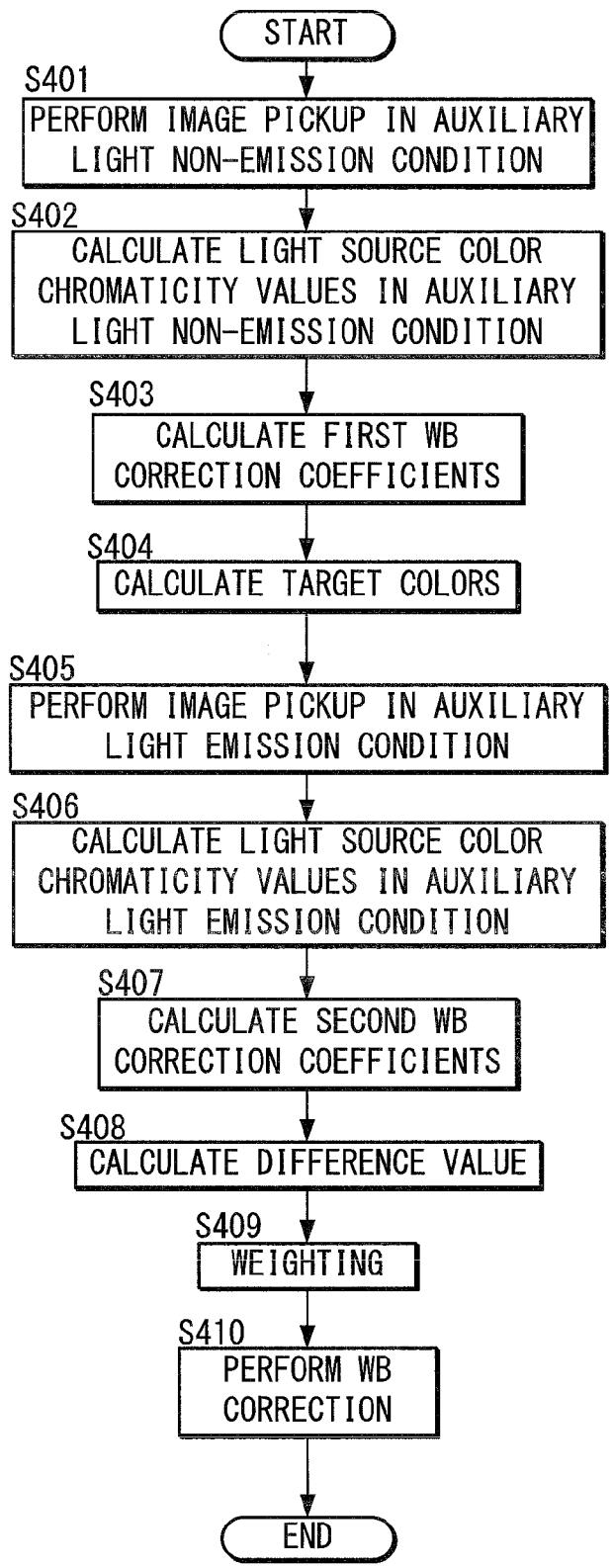
FIG. 9 is a flowchart illustrating WB correction according to the fourth embodiment of this invention.

Next, WB correction according to the fourth embodiment will be described using a flowchart shown in FIG. 9.

Steps S401 to S403 are identical to the steps S301 to S303 of the third embodiment, and therefore description thereof is omitted. As a result, the first WB correction coefficients $G_r^1$, $G_b^1$ are calculated.

In a step S404, the target colors $w_{r/g}^O$, $w_{b/g}^O$ are selected in accordance with the color setting selected by the user.

Steps S405 to S410 are identical to the steps S305 to S310 of the third embodiment, and therefore description thereof is omitted. As a result, image data obtained through image pickup in the auxiliary light emission condition are stored in the first frame memory 8, and the second WB correction coefficients $G_r^2$, $G_b^2$ are calculated. Further, the third WB correction coefficients $G_r^3$, $G_b^3$ are calculated by weighting the first WB correction coefficients $G_r^1$, $G_b^1$ and second WB correction coefficients $G_r^2$, $G_b^2$, and WB correction is performed on the image data stored in the first frame memory 8.

Next, effects of the fourth embodiment of this invention will be described.

The target colors $w_{r/g}^O$, $w_{b/g}^O$ are set in accordance with a color setting selected by the user, and the third WB correction coefficients $G_r^3$, $G_b^3$ are calculated by weighting the first WB correction coefficients $G_r^3$, $G_b^1$ and the second WB correction coefficients $G_r^2$, $G_b^2$ in accordance with the difference value between the auxiliary light emission condition and the auxiliary light non-emission condition. Furthermore, WB correction is performed on the image data stored in the first frame memory 8 on the basis of the third WB correction coefficients $G_r^3$, $G_b^3$, and therefore the tint of the part that is actually reached by the auxiliary light can be modified to a tint corresponding to an illumination color set as desired by the user. As a result, a realistic photograph in which the flash color actually appears to vary can be taken.

Figure 10:
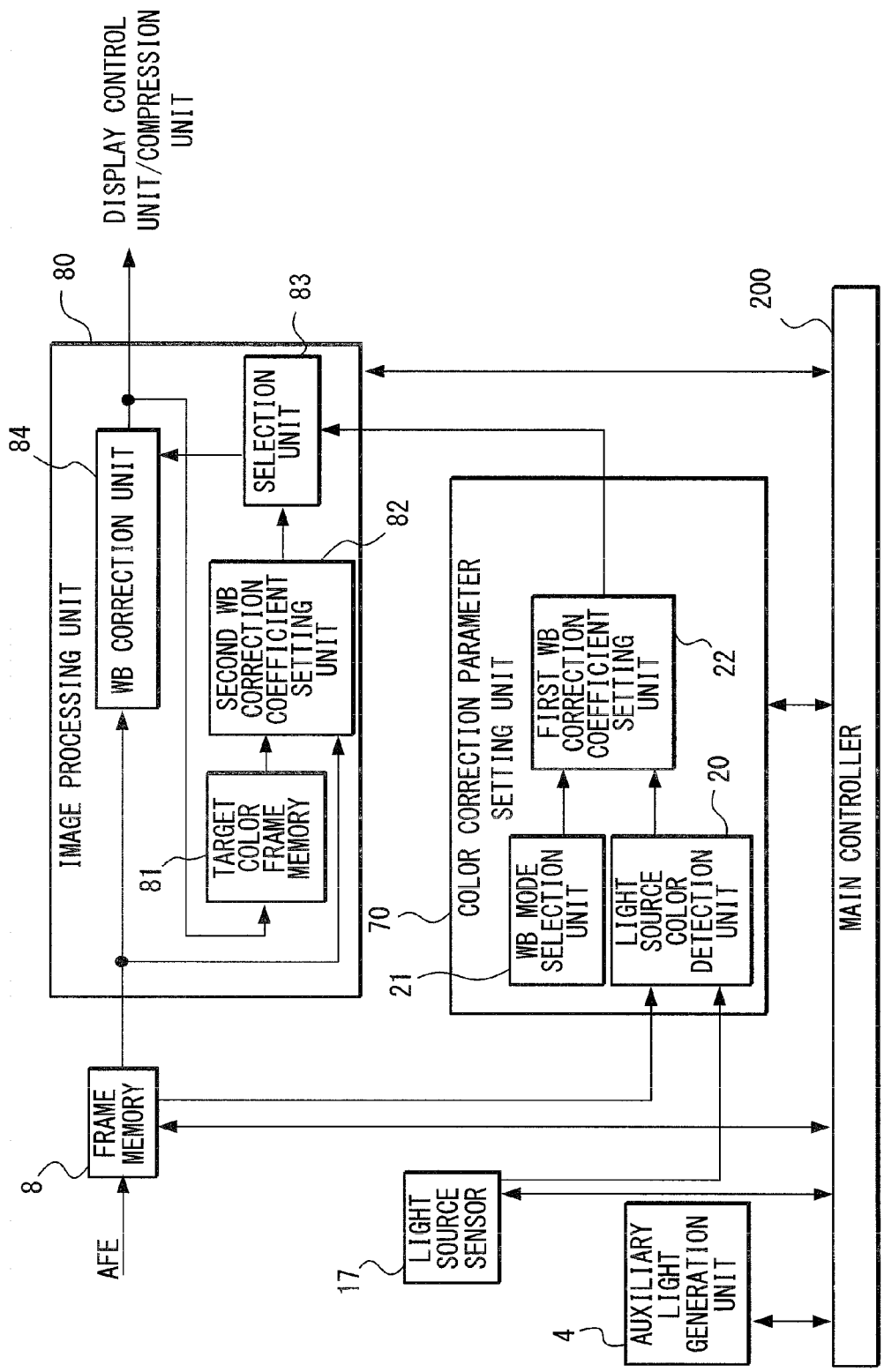
FIG. 10 is a block diagram showing a part of a camera according to a fifth embodiment of this invention.

Next, a fifth embodiment of this invention will be described using FIG. 10. FIG. 10 is a partial block diagram of a camera according to the fifth embodiment. The fifth embodiment differs from the first embodiment in the constitution of a color correction parameter setting unit 70 and an image processing unit 80. All other constitutions are identical to the first embodiment, and therefore description thereof has been omitted.

The color correction parameter setting unit 70 comprises the light source color detection unit 20, the WB mode selection unit 21, and the first WB correction coefficient setting unit 22.

The image processing unit 80 includes a target color frame memory 81, a second WB correction coefficient setting unit 82, a selection unit 83, and a WB correction unit 84.

The target color frame memory 81 stores image data obtained through image pickup in the auxiliary light non-emission condition and subjected to correction using the first WB correction coefficients $G_r^1$, $G_b^1$. It should be noted that the image data stored in the target color frame memory 81 may be image data constituted by all pixels following the first WB correction, or image data reduced by thinning or pixel averaging.

The second WB correction coefficient setting unit 82 sets second WB correction coefficients $G_r^2(\Omega)$, $G_b^2(\Omega)$ on the basis of the image data subjected to the first WB correction and stored in the target color frame memory 81 and the image data obtained through image pickup in the auxiliary light emission condition and stored in the frame memory 8.

The selection unit 83 selects the first WB correction coefficients $G_r^1$, $G_b^1$ set by the first WB correction coefficient setting unit 22 or the second WB correction coefficients $G_r^2(\Omega)$, $G_b^2(\Omega)$ set by the second WB correction coefficient setting unit 82, and outputs the selected correction coefficients to the WB correction unit 84. When the second WB correction coefficients are set, the selection unit 83 outputs the second WB correction coefficients $G_r^2(\Omega)$, $G_b^2(\Omega)$ to the WB correction unit 84.

When image pickup is performed in the auxiliary light emission condition, the WB correction unit 84 first performs the first WB correction on the image data obtained in the auxiliary light non-emission condition using the first WB correction coefficients $G_r^1$, $G_b^1$. When the second WB correction coefficients $G_r^2(\Omega)$, $G_b^2(\Omega)$ are set, the WB correction unit 84 performs the second WB correction on the image data obtained through image pickup in the auxiliary light emission condition and stored in the frame memory 8 using the second WB correction coefficients $G_r^2(\Omega)$, $G_b^2(\Omega)$.

Figure 11:
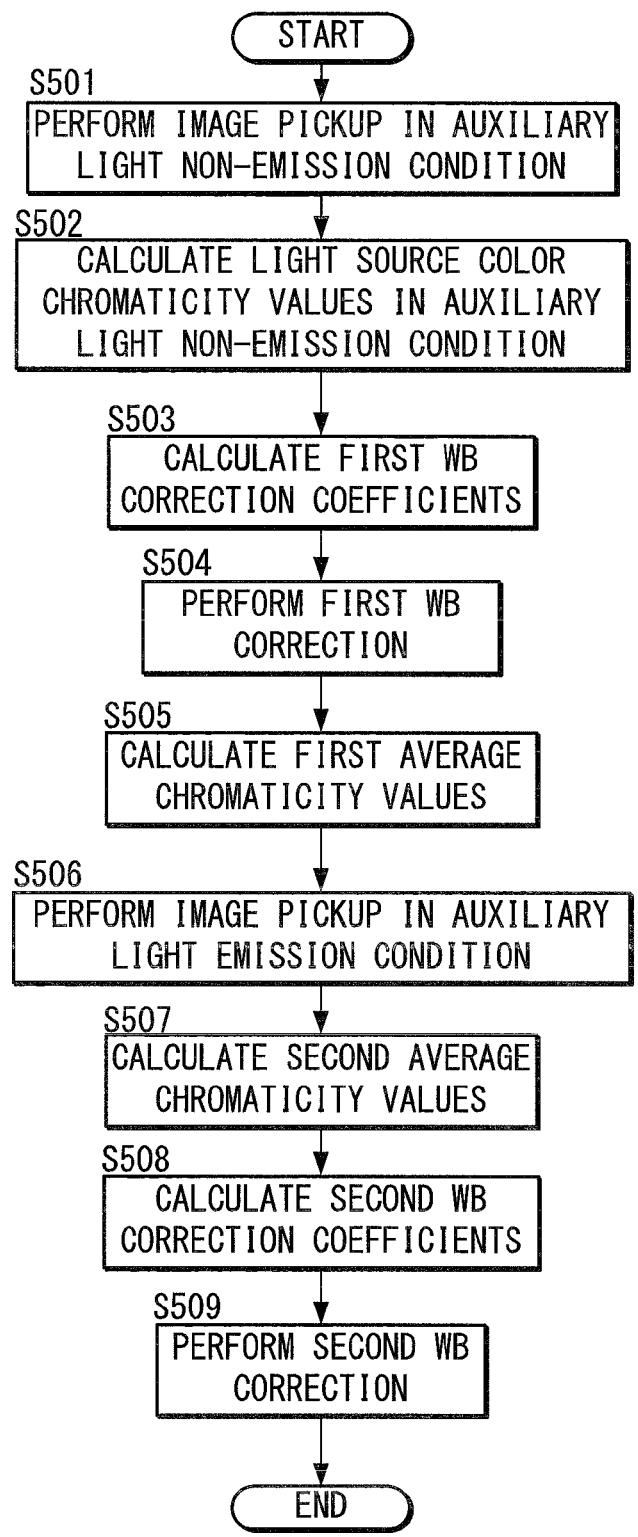
FIG. 11 is a flowchart illustrating WB correction according to the fifth embodiment of this invention.

Next, a WB correction calculation method according to the fifth embodiment will be described using a flowchart shown in FIG. 11.

Steps S501 to S503 are identical to the steps S101 to S103 of the first embodiment, and therefore description thereof is omitted. As a result, the first WB correction coefficients $G_r^1$, $G_b^1$ are calculated.

In a step S504, the first WB correction is performed on the image data obtained through image pickup in the auxiliary light non-emission condition and stored in the frame memory 8 using the first WB correction coefficients $G_r^1$, $G_b^1$. The image data subjected to the first WB correction are then stored in the target color frame memory 81.

In a step S505, first average chromaticity values $w_{r/g}^O(\Omega)$, $w_{b/g}^O(\Omega)$ of a pixel corresponding to a predetermined partial region $\Omega$ of the image data subjected to the first WB correction are calculated using Equation (5) on the basis of the image data stored in the target color frame memory 81.

$$w_{r/g}^O(\Omega) = \sum_{i \in \Omega} r_i^O / g_i^O \qquad \text{Equation (5)}$$

$$w_{b/g}^O(\Omega) = \sum_{i \in \Omega} b_i^O / g_i^O$$

Here, $r_i^O$, $g_i^O$, $b_i^O$ respectively denote RGB values in a pixel position i of the image data subjected to the first WB correction.

In a step S506, main image pickup is performed by emitting auxiliary light. Image data obtained as a result are stored in the frame memory 8.

In a step S507, second average chromaticity values $w_{r/g}^F(\Omega)$, $w_{b/g}^F(\Omega)$ of a pixel corresponding to a predetermined partial region Q of the image data obtained through image pickup in the auxiliary light emission condition are calculated using Equation (6) on the basis of the image data stored in the frame memory 8.

$$w_{r/g}^F(\Omega) = \sum_{i \in \Omega} r_i^F / g_i^F \qquad \text{Equation (6)}$$

$$w_{b/g}^F(\Omega) = \sum_{i \in \Omega} b_i^F / g_i^F$$

Here, $r_i^F$, $g_i^F$, $b_i^F$ respectively denote RGB values in a pixel position i of the image data obtained through image pickup in the auxiliary light emission condition.

In a step S508, the image data obtained through image pickup in the auxiliary light emission condition and stored in the frame memory 8 are compared with the image data subjected to the first WB correction using the first WB correction coefficients $G_r^1$, $G_b^1$ and stored in the target color frame memory 81 in each predetermined partial region $\Omega$, and the second WB correction coefficients $G_r^2(\Omega)$, $G_b^2(\Omega)$ are calculated in each predetermined partial region $\Omega$ using Equation (7) such that a chromaticity value of the image in the auxiliary light emission condition approaches a chromaticity value of the auxiliary light non-emission condition.

$$G_r^2(\Omega) = \frac{w_{r/g}^O(\Omega)}{w_{r/g}^F(\Omega)} \qquad \text{Equation (7)}$$

$$G_b^2(\Omega) = \frac{w_{b/g}^O(\Omega)}{w_{b/g}^F(\Omega)}$$

In a step S509, the second WB correction is performed on the image data stored in the frame memory 8 using the second WB correction coefficients $G_r^2(\Omega), G_b^2(\Omega)$. Here, the second WB correction is performed by applying the second WB correction coefficients $G_r^2(\Omega), G_b^2(\Omega)$ to the image captured in the auxiliary light emission condition in each pixel. As a result, an image having a tint corresponding to the auxiliary light non-emission condition in regions where the tint varies due to auxiliary light emission can be created.

An object detection unit may be provided in front of the second WB correction coefficient setting unit 82. In this case, a face part or the like, for example, is detected on the basis of the image data stored in the frame memory 8, and individual object regions of the image are handled as the partial regions. The second WB correction coefficients $G_r^2(\Omega), G_b^2(\Omega)$ may then be modified in accordance with the individual objects such that color reproduction suited to each object is performed.

Effects of the fifth embodiment of this invention will now be described.

In the auxiliary light non-emission condition, the first WB correction is performed and the first average chromaticity values $w_{r/g}^O(\Omega), w_{b/g}^O(\Omega)$ are calculated. In the auxiliary light emission condition, the second average chromaticity values $w_{r/g}^F(\Omega), w_{b/g}^F(\Omega)$ are calculated. The second WB correction coefficients $G_r^2(\Omega), G_b^2(\Omega)$ are then calculated in each predetermined partial region by dividing the first average chromaticity values $w_{r/g}^O(\Omega), w_{b/g}^O(\Omega)$ by the second average chromaticity values $w_{r/g}^F(\Omega), w_{b/g}^F(\Omega)$. WB correction is then performed on the image data obtained through image pickup in the auxiliary light emission condition using the second WB correction coefficients $G_r^2(\Omega), G_b^2(\Omega)$, and as a result, the tint of the parts that are actually reached by the auxiliary light can be modified to the tint of the auxiliary light non-emission condition.

Figure 12:
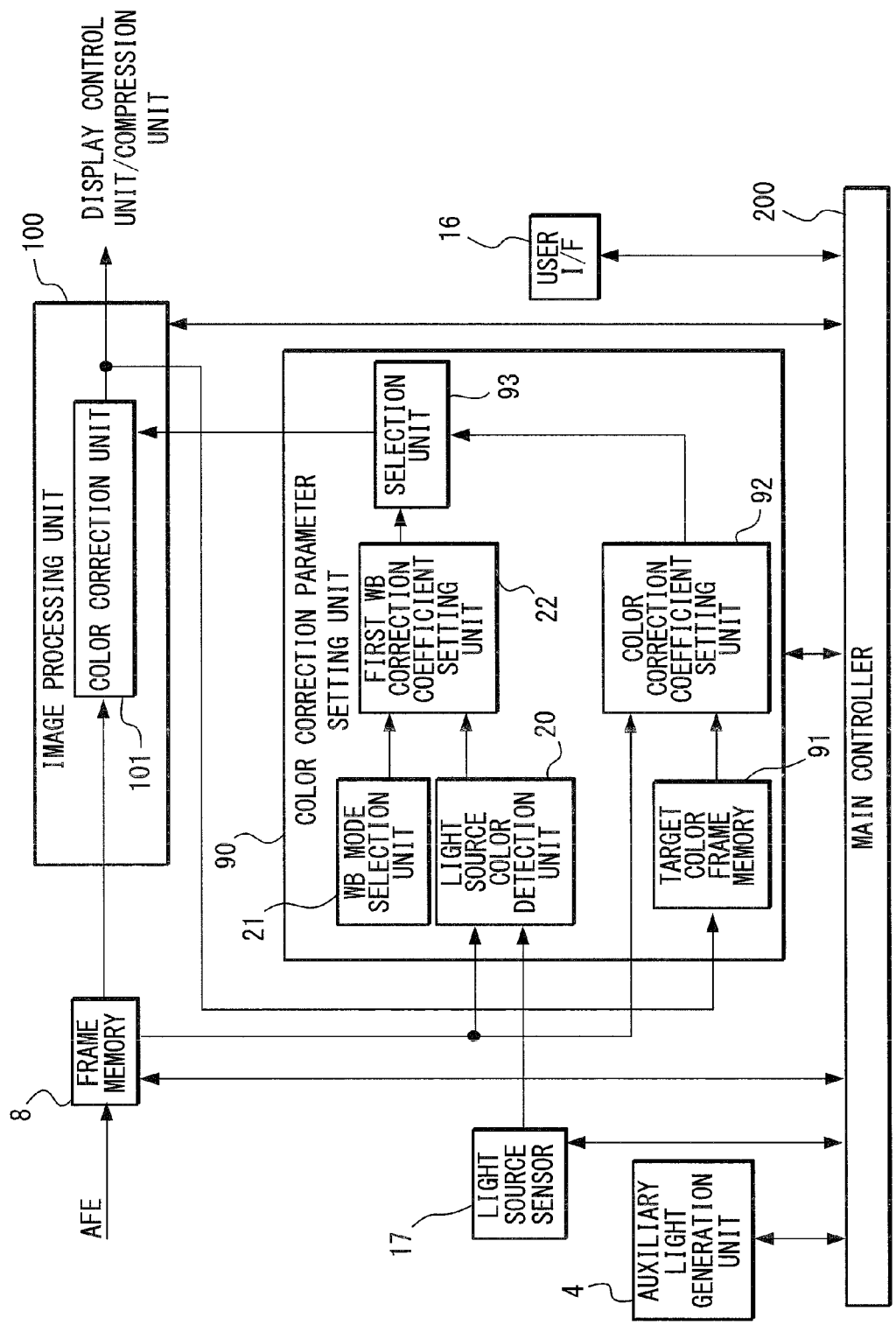
FIG. 12 is a block diagram showing a part of a camera according to a sixth embodiment of this invention.

Next, a sixth embodiment of this invention will be described using FIG. 12. FIG. 12 is a partial block diagram of a camera according to the sixth embodiment. The sixth embodiment differs from the first embodiment in the constitution of a color correction parameter setting unit 90 and an image processing unit 100. All other constitutions are identical to the first embodiment, and therefore description thereof has been omitted.

The image processing unit 100 includes a color correction unit 101. The color correction unit 101 not only multiplies WB correction coefficients by RGB values, but also corrects the values of a plurality of colors in an RGB color space to predetermined color values using color matrix correction, a three-dimensional LUT (Look Up Table), or similar.

The color correction parameter setting unit 90 comprises the light source color detection unit 20, the WB mode selection unit 21, the first WB correction coefficient setting unit 22, a target color frame memory 91, a color correction coefficient setting unit (second tint correction coefficient setting unit) 92, and a selection unit 93.

The target color frame memory 91 stores image data obtained through image pickup in the auxiliary light non-emission condition and subjected to first WB correction using the first WB correction coefficients $G_r^1, G_b^1$. It should be noted that image data subjected not only to WB correction but also color correction such as matrix correction or LUT correction using preset, shared, predetermined color correction parameters may be stored.

The color correction coefficient setting unit 92 calculates a color correction coefficient M1 on the basis of the color-corrected image data in the auxiliary light non-emission condition stored in the target color frame memory 91 and the image data in the auxiliary light emission condition stored in the frame memory 8.

The selection unit 93 selects, in accordance with the emission/non-emission condition of the auxiliary light generation unit 4, either the first WB correction coefficients $G_r^1, G_b^1$ calculated by the first WB correction coefficient setting unit 22 or the color correction coefficient M1 calculated by the color correction coefficient setting unit 92, and outputs the selected coefficient to the color correction unit 101. When auxiliary light is not emitted by the auxiliary light generation unit 4, the first WB correction coefficients $G_r^1, G_b^1$ are selected. When auxiliary light is emitted by the auxiliary light generation unit 4, on the other hand, the first WB correction coefficients $G_r^1, G_b^1$ are selected first, followed by the color correction coefficient M1.

Figure 13:
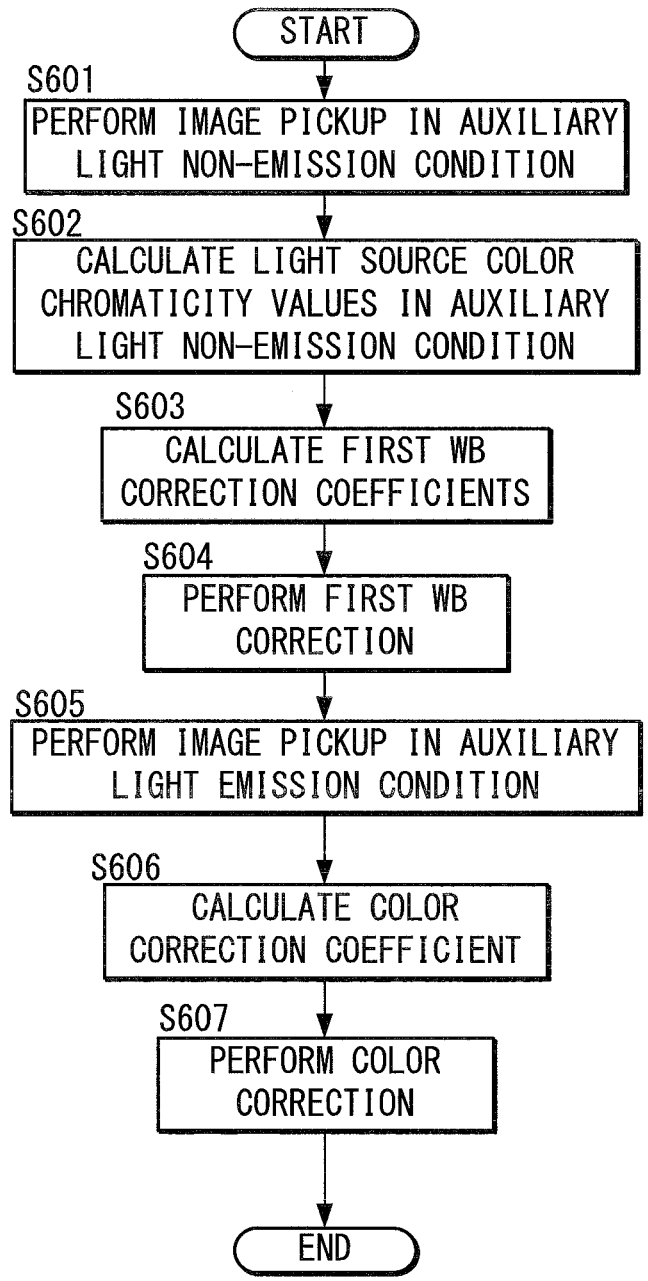
FIG. 13 is a flowchart illustrating WB correction according to the sixth embodiment of this invention.

Next, WB correction according to the sixth embodiment will be described using a flowchart shown in FIG. 13.

Steps S601 to S603 are identical to the steps S101 to S103 of the first embodiment, and therefore description thereof is omitted. As a result, the first WB correction coefficients $G_r^1, G_b^1$ are calculated.

In a step S604, the first WB correction is performed on the image data obtained through image pickup in the auxiliary light non-emission condition and stored in the frame memory 8 using the first WB correction coefficients $G_r^1, G_b^1$. Here, color correction such as matrix correction or LUT correction using preset, shared, predetermined color correction parameters may be performed in addition to the WB correction. The corrected image data are then stored in the target color frame memory 91.

In a step S605, main image pickup is performed by emitting auxiliary light. Image data obtained as a result are stored in the frame memory 8.

In a step S606, three RGB values InR (i), InG (i), InB (i) (i=1, 2, 3) are extracted from the image data obtained through image pickup in the auxiliary light emission condition and stored in the frame memory 8. Further, three RGB values OutR (i), OutG (i), OutB (i) (i=1, 2, 3) are extracted from the image data obtained through image pickup in the auxiliary light non-emission condition, corrected using the first WB correction coefficients $G_r^1, G_b^1$, and stored in the target color frame memory 91. The color correction coefficient M1 is then calculated on the basis of Equation (8). The three RGB values may be extracted using a method of extracting the values from a predetermined pixel of the image data stored in the frame memory 8 or the target color frame memory 91 or a method of extracting values calculated from a plurality of pixel values such as an average value or a standard deviation value of the image.

Equation (8)

$$M1 = \begin{bmatrix} a & b & c \\ d & e & f \\ g & h & i \end{bmatrix}$$

$$= \begin{bmatrix} OutR_1 & OutR_2 & OutR_3 \\ OutG_1 & OutG_2 & OutG_3 \\ OutB_1 & OutB_2 & OutB_3 \end{bmatrix} \cdot \begin{bmatrix} InR_1 & InR_2 & InR_3 \\ InG_1 & InG_2 & InG_3 \\ InB_1 & InB_2 & InB_3 \end{bmatrix}^{-1}$$

Here, the color correction coefficient M1 is calculated by extracted three values, but the color correction coefficient M1 may be calculated using a method of least squares by extracting three or more values.

In a step S607, color correction is performed on the image data obtained through image pickup in the auxiliary light emission condition and stored in the frame memory 8 using the color correction coefficient M1.

Effects of the sixth embodiment of this invention will now be described.

The color correction coefficient M1 is calculated on the basis of the image data subjected to the first WB correction and the image data obtained through image pickup in the auxiliary light emission condition. The image data obtained through image pickup in the auxiliary light emission condition are then subjected to color correction using the color correction coefficient M1. The color correction coefficient M1 has a larger degree of freedom than the first WB coefficients $G_r^1$, $G_b^1$, and therefore a color distribution in the auxiliary light emission condition can be aligned with a color distribution in the auxiliary light non-emission condition following color correction with respect to a plurality of colors, such as skin color or green, for example, in addition to an achromatic object. As a result, color correction can be performed with a high degree of precision in relation to a plurality of object colors.

Figure 14:
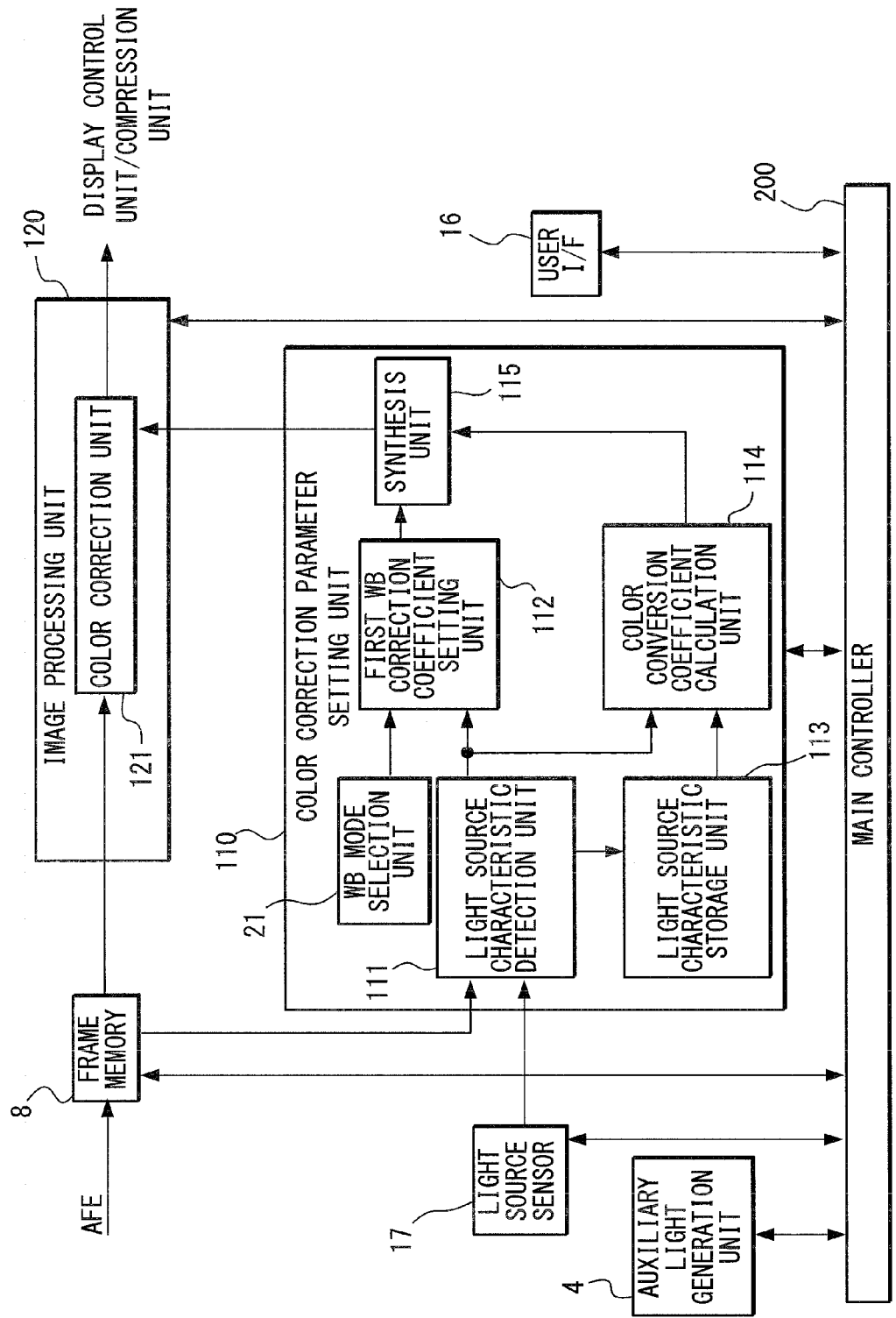
FIG. 14 is a block diagram showing a part of a camera according to a seventh embodiment of this invention.

Next, a seventh embodiment of this invention will be described using FIG. 14. FIG. 14 is a partial block diagram of a camera according to the seventh embodiment. The seventh embodiment differs from the sixth embodiment in the constitution of a color correction parameter setting unit 110 and an image processing unit 120. All other constitutions are identical to the sixth embodiment, and therefore description thereof has been omitted.

The image processing unit 120 includes a color correction unit 121. The color correction unit 121 not only applies WB correction to respective RGB values, but also performs correction to modify the values of a plurality of colors in an RGB color space to predetermined color values with a color correction parameter M2, to be described in detail below, using color matrix correction, a three-dimensional LUT (Look Up Table), or similar.

The color correction parameter setting unit 110 comprises a light source characteristic detection unit 111, the WB mode selection unit 21, a first WB correction coefficient setting unit 112, a light source characteristic storage unit 113, a color conversion coefficient calculation unit (second tint correction coefficient setting unit) 114, and a synthesis unit 115.

The light source characteristic detection unit 110 detects a spectral characteristic (light source spectral characteristic) of the light source at the time of image pickup (in the auxiliary light emission condition and the auxiliary light non-emission condition) on the basis of a signal obtained from the light source sensor 17 of the image data stored in the frame memory 8.

The first WB correction coefficient setting unit 112 sets the first WB correction coefficients $G_r^1$, $G_b^1$ in accordance with a light source spectral characteristic in the auxiliary light non-emission condition, which is detected by the light source characteristic detection unit 111, or a light source spectral characteristic selected by the WB mode selection unit 21 via the user I/F 16.

The light source characteristic storage unit 113 stores the light source spectral characteristic of the auxiliary light non-emission condition detected by the light source characteristic detection unit 111.

The color conversion coefficient calculation unit 114 calculates the color correction coefficient (color conversion coefficient) M2 for converting a color space of an object color under the light source of the auxiliary light emission condition into a color space of the object color under the light source of the auxiliary light non-emission condition using the light source spectral characteristic of the auxiliary light non-emission condition, which is stored in the light source characteristic storage unit 113, and the light source spectral characteristic of the auxiliary light emission condition.

The synthesis unit 115 calculates a color correction parameter M' by synthesizing the color correction coefficient M2 and the first WB correction coefficients $G_r^1$, $G_b^1$, and then outputs the color correction parameter M' to the color correction unit 121.

Figure 15:
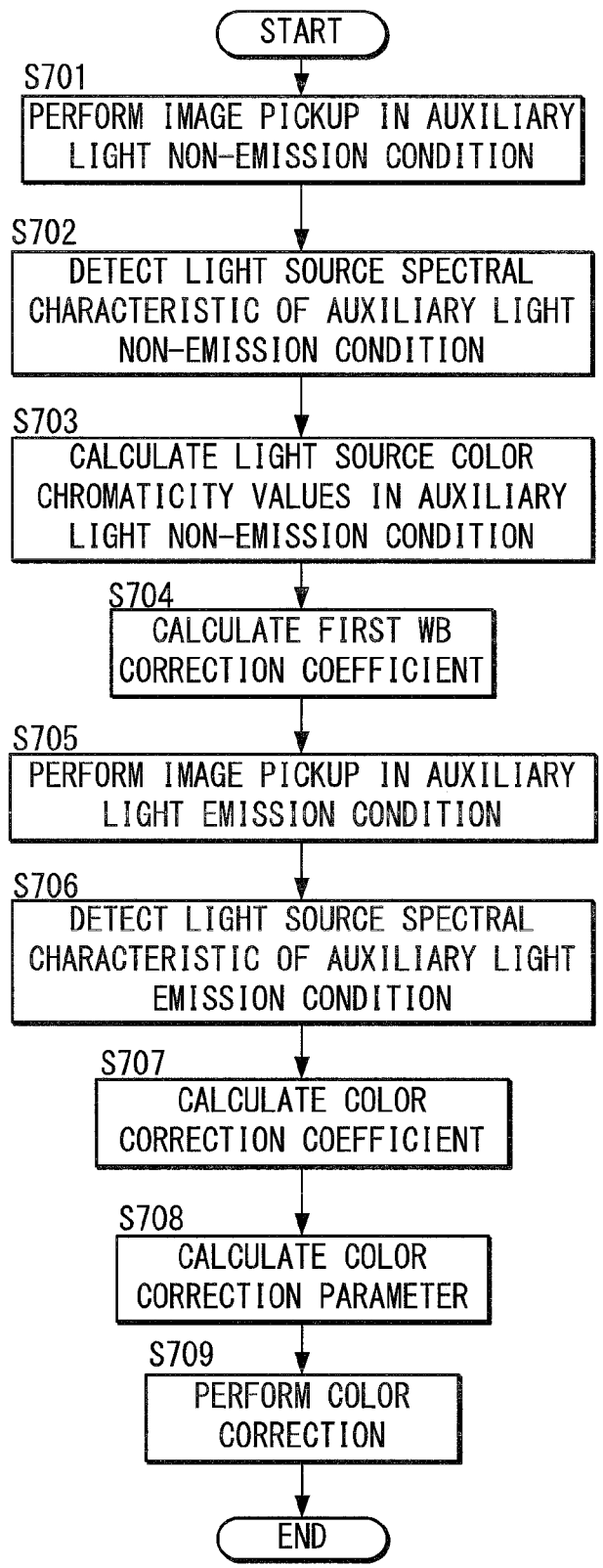
FIG. 15 is a flowchart illustrating color correction according to the seventh embodiment of this invention.

Next, color correction according to the seventh embodiment will be described using a flowchart shown in FIG. 15.

In a step S701, image pickup is performed in the auxiliary light non-emission condition, and the obtained image data are stored in the frame memory 8.

In a step S702, a light source spectral characteristic Es ($\lambda$) of the auxiliary light non-emission condition is detected on the basis of the image captured in the auxiliary light non-emission condition or a signal from the light source sensor 17 in the auxiliary light non-emission condition.

In a step S703, chromaticity values $w_{r/g}^S$ $w_{b/g}^S$ of the light source color are calculated on the basis of the light source spectral characteristic Es ($\lambda$).

In a step S704, the first WB correction coefficients $G_r^1$, $G_b^1$ are calculated on the basis of the chromaticity values $w_{r/g}^S$, $w_{b/g}^S$ of the light source color. It should be noted that the first WB correction coefficients $G_r^1$, $G_b^1$ are calculated using a similar method to the first embodiment.

In a step S705, main image pickup is performed by emitting auxiliary light. Image data obtained as a result are stored in the frame memory 8.

In a step S706, a light source spectral characteristic Ef ($\lambda$) of the auxiliary light emission condition is detected on the basis of a signal output by the light source sensor 17 in the auxiliary light emission condition or the image data obtained during main image pickup.

In a step S707, the color correction coefficient M2 is calculated using Equation (9) on the basis of the light source spectral characteristic Es ($\lambda$) of the auxiliary light non-emission condition and the light source spectral characteristic Ef ($\lambda$) of the auxiliary light emission condition.

$$M2 = \begin{bmatrix} a & b & c \\ d & e & f \\ g & h & i \end{bmatrix}$$

$$= \begin{bmatrix} OutR_1 & OutR_2 & OutR_3 \\ OutG_1 & OutG_2 & OutG_3 \\ OutB_1 & OutB_2 & OutB_3 \end{bmatrix} \cdot \begin{bmatrix} InR_1 & InR_2 & InR_3 \\ InG_1 & InG_2 & InG_3 \\ InB_1 & InB_2 & InB_3 \end{bmatrix}^{-1}$$

$$InR_i = \int_{380}^{780} E_S(\lambda) \cdot O_i(\lambda) \cdot R(\lambda) d\lambda$$

$$InG_i = \int_{380}^{780} E_S(\lambda) \cdot O_i(\lambda) \cdot G(\lambda) d\lambda$$

$$InB_i = \int_{380}^{780} E_S(\lambda) \cdot O_i(\lambda) \cdot B(\lambda) d\lambda$$

Equation (9)

-continued $$OutR_i = \int_{380}^{780} E_F(\lambda) \cdot O_i(\lambda) \cdot R(\lambda) d\lambda$$

$$OutG_i = \int_{380}^{780} E_F(\lambda) \cdot O_i(\lambda) \cdot G(\lambda) d\lambda$$

$$OutB_i = \int_{380}^{780} E_F(\lambda) \cdot O_i(\lambda) \cdot B(\lambda) d\lambda$$

It should be noted that Oi (λ) (i=1 to 3) denotes a spectral reflectance of three objects (for example, skin, sky, green, and so on) set in advance as color matching reference objects, while R (λ), G (λ), B (λ) are RGB spectral sensitivity characteristics of the imaging device 3.

In a step S708, the color correction parameter M' is calculated using Equation (10) on the basis of the first WB correction coefficients $G_r^1$, $G_b^1$ and the color correction coefficient M2.

$$M' = \begin{bmatrix} a' & b' & c' \\ d' & e' & f' \\ g' & h' & i' \end{bmatrix} \quad \text{Equation (10)}$$

$$= \begin{bmatrix} G_r^1 & 0 & 0 \\ 0 & 1 & 0 \\ 0 & 0 & G_b^1 \end{bmatrix} \cdot \begin{bmatrix} a & b & c \\ d & e & f \\ g & h & i \end{bmatrix}$$

In a step S709, image pickup is performed in the auxiliary light emission condition using the color correction parameter M', and color correction is performed on the image data stored in the frame memory 8.

It should be noted that in this embodiment, the color correction coefficient M is set as a 3×3 matrix coefficient, but by using a conversion coefficient (a LUT) having a larger degree of freedom, highly precise color correction can be performed with respect to a larger number of object colors.

Further, in this embodiment, the color correction coefficient M of the auxiliary light non-emission condition is set on the basis of the first WB correction coefficients $G_r^1$, $G_b^1$ alone. However, a correction parameter, for example matrix correction using a preset, shared, predetermined color correction parameter, LUT correction, or the like may be set in addition to the first WB correction coefficients $G_r^1$, $G_b^1$. Then, when auxiliary light is emitted, the correction parameter may be synthesized with the parameter for converting the color space of the auxiliary light emission condition into the color space of the auxiliary light non-emission condition by the synthesis unit 115.

Effects of the seventh embodiment of this invention will now be described.

The color correction coefficient M2 is calculated on the basis of the light source spectral characteristic Es (λ) of the auxiliary light non-emission condition and the light source spectral characteristic Ef (λ) of the auxiliary light emission condition. The color correction parameter M' is then calculated on the basis of the first WB correction coefficients $G_r^1$, $G_b^1$ and the color correction coefficient M2, whereupon color correction is performed on the image data obtained through image pickup in the auxiliary light emission condition using the color correction parameter M'. As a result, color correction can be performed with a higher degree of precision in relation to a plurality of object colors.

Furthermore, a constitution in which color correction is performed in the digital camera main body was described above, but this invention is not limited thereto, and color correction processing such as that described above may be performed using development software provided separately from the digital camera main body, for example.

In this case, the image processing device comprises main storage devices such as a CPU and a RAM, and a computer-readable storage medium storing a program for realizing all or a part of the processing described above. Here, this program will be known as an image processing program. By having the CPU read the image processing program stored on the storage medium so as to execute information processing/calculation processing, similar processing to that of the image processing device described above is realized.

Figure 16:
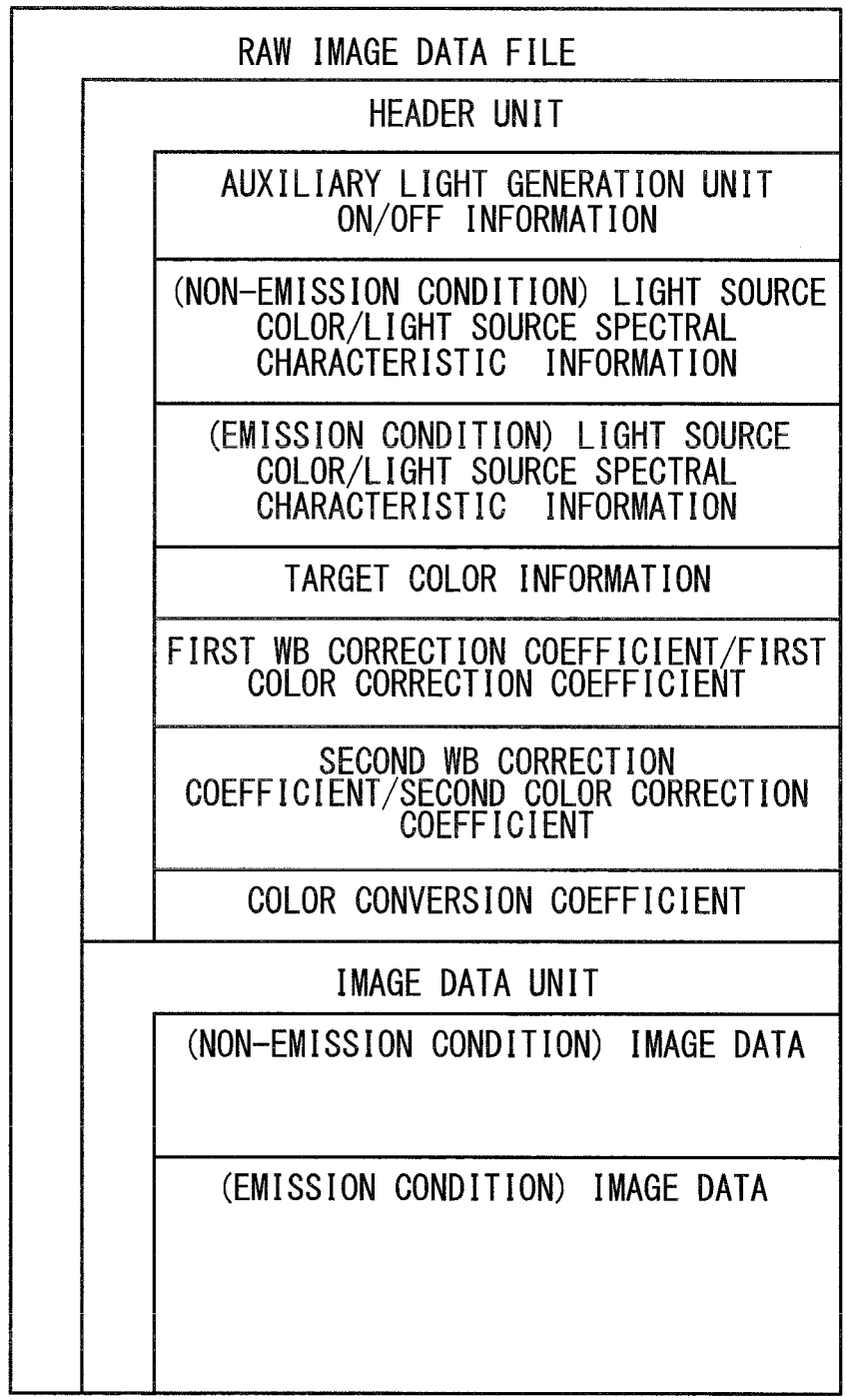
FIG. 16 is a view showing an example of a computer-readable storage medium storing color correction according to this invention.

For example, as shown by an example of a RAW image format in FIG. 16, image pickup parameters required during the above processing may be attached to a captured image in the digital camera main body and stored in a computer-readable storage medium.

Here, the computer-readable storage medium is a magnetic disk, a magneto-optical disk, a CD-ROM, a DVD-ROM, a semiconductor memory, or similar. Alternatively, the image processing program may be distributed to a computer via a communication line such that the computer, having received the distributed program, executes the image processing program.

This invention is not limited to the embodiment described above, and may be subjected to various alterations and modifications within the scope of the technical spirit thereof.

This application claims priority based on Japanese Patent Application 2009-30003, filed with the Japan Patent Office on Feb. 12, 2009, the entire contents of which are incorporated into this specification by reference.

What is claimed is:

1. An image pickup device including an auxiliary light generation unit for emitting an auxiliary light during an image pickup operation, comprising:
   an image acquisition unit for obtaining an image of an object;
   a light source characteristic acquisition unit for obtaining a light source characteristic of the image pickup operation;
   a first white balance (WB) correction coefficient setting unit for setting, on the basis of the light source characteristic of an image pickup operation performed in an auxiliary light non-emission condition, a first WB correction coefficient for correcting a tint of an image captured in the auxiliary light non-emission condition to the tint of a peripheral light of the auxiliary light non-emission condition;
   a first WB correction unit for setting a target color by performing a first WB correction on an image data obtained in the image pickup operation performed in the auxiliary light non-emission condition based on the light source characteristic and the first WB correction coefficient, the target color based on image data stored in a target color frame memory;
   a second WB correction coefficient setting unit for setting a second WB correction coefficient on the basis of: (a) the target color and the light source characteristic of an image pickup operation performed in an auxiliary light emission condition, (b) a first average chromaticity value of a predetermined region in an image data having the target color, wherein the image data associated with the first average chromaticity value is obtained in the image pickup operation performed in the auxiliary light non-emission condition, and (c) a second average chromaticity value of the predetermined region in an image data obtained in the image pickup operation performed in the auxiliary light emission condition, wherein the second WB correction coefficient is for correcting the tint of an image captured in the auxiliary light emission condition to the tint of the auxiliary light non-emission condition; and an image processing unit for generating an image having the tint of the auxiliary light non-emission condition on the basis of the first WB correction coefficient and the second WB correction coefficient when the image pickup operation is performed in the auxiliary light emission condition.

2. The image pickup device as defined in claim 1, wherein the first WB correction coefficient setting unit further sets a chromaticity WB correction coefficient for correcting a chromaticity value of image data obtained during the image pickup operation performed in the auxiliary light non-emission condition to a chromaticity value of the peripheral light of the auxiliary light non-emission condition, the second WB correction coefficient setting unit further sets, on the basis of the target color and image data obtained during the image pickup operation performed in the auxiliary light emission condition, a chromaticity WB correction coefficient for correcting a chromaticity value of image data obtained during the image pickup operation performed in the auxiliary light emission condition to a chromaticity value of the image data captured in the auxiliary light non-emission condition, and the image processing unit generates image data having the tint of the auxiliary light non-emission condition on the basis of the chromaticity WB correction coefficient and the chromaticity WB correction coefficient when the image pickup operation is performed in the auxiliary light emission condition.

3. The image pickup device as defined in claim 2, further comprising:

a subtraction unit for calculating a difference value, which is a deviation between the image data obtained during the image pickup operation performed in the auxiliary light non-emission condition and the image data obtained during the image pickup operation performed in the auxiliary light emission condition, for each pixel; and a second WB correction unit for performing a second WB correction on the difference value on the basis of the second WB correction coefficient, wherein the image processing unit generates image data having the tint of the auxiliary light non-emission condition by adding the difference value corrected by the second WB correction unit to the image data corrected by the first WB correction unit when the image pickup operation is performed in the auxiliary light emission condition.

4. The image pickup device as defined in claim 2, further comprising:

a subtraction unit for calculating a difference value, which is a deviation between the image data obtained during the image pickup operation performed in the auxiliary light non-emission condition and the image data obtained during the image pickup operation performed in the auxiliary light emission condition, for each pixel; and a weighting unit for calculating, on the basis of the difference value, a third WB correction coefficient in which a ratio between the first WB correction coefficient and the second WB correction coefficient is weighted for each pixel, wherein the image processing unit converts the image data obtained during the image pickup operation performed in the auxiliary light emission condition into image data having the tint of the auxiliary light non-emission condition on the basis of the third WB correction coefficient.

5. The image pickup device as defined in claim 2, wherein the first WB correction setting unit sets a target color of an achromatic object in the auxiliary light non-emission condition on the basis of the first WB correction coefficient.

6. The image pickup device as defined in claim 1, further comprising a synthesis unit for setting a color correction parameter used to subject the image data obtained in the image pickup operation performed in the auxiliary light emission condition to color correction, wherein the light source characteristic acquisition unit obtains a light source spectral characteristic of the image pickup operation, the second WB correction coefficient setting unit sets a color conversion coefficient on the basis of a light source spectral characteristic obtained in the image pickup operation performed in the auxiliary light emission condition and a light source spectral characteristic obtained in the image pickup operation performed in the auxiliary light non-emission condition, the synthesis unit sets the color correction parameter by synthesizing the first WB correction coefficient and the color conversion coefficient, and the image processing unit converts the image data obtained in the image pickup operation performed in the auxiliary light emission condition into image data having the tint of the auxiliary light non-emission condition on the basis of the color correction parameter.

7. An electronic machine comprising the image pickup device as defined in claim 1.

8. An image processing method for processing an image captured by emitting an auxiliary light during an image pickup operation, comprising:

obtaining an image of an object;

obtaining a light source characteristic of the image pickup operation;

setting, on the basis of the light source characteristic of an image pickup operation performed in an auxiliary light non-emission condition, a first tint correction coefficient for correcting a tint of an image captured in the auxiliary light non-emission condition to the tint of a peripheral light of the auxiliary light non-emission condition;

setting, by performing a first tint correction on an image data obtained in the image pickup operation performed in the auxiliary light non-emission condition and based on the light source characteristic and the first tint correction coefficient, a target color;

setting a second tint correction coefficient on the basis of: (a) the target color and the light source characteristic of an image pickup operation performed in an auxiliary light emission condition, (b) a first average chromaticity value of a predetermined region in an image data having the target color, wherein the image data associated with the first average chromaticity value is obtained in the image pickup operation performed in the auxiliary light non-emission condition, and (c) a second average chromaticity value of the predetermined region in an image data obtained in the image pickup operation performed in the auxiliary light emission condition, wherein the second tint correction coefficient is for correcting the tint of an image captured in the auxiliary light emission condition to the tint of the auxiliary light non-emission condition; and generating an image having the tint of the auxiliary light non-emission condition on the basis of the first tint correction coefficient and the second tint correction coefficient when the image pickup operation is performed in the auxiliary light emission condition.

9. A computer-readable storage device storing a program executed by a computer, wherein the program causes the computer to execute:

an image acquisition step for obtaining an image of an object;

a light source characteristic acquisition step for obtaining a light source characteristic of the image pickup operation;

a first tint correction coefficient setting step for setting, on the basis of the light source characteristic of an image pickup operation performed in an auxiliary light non-emission condition, a first tint correction coefficient for correcting a tint of an image captured in the auxiliary light non-emission condition to the tint of a peripheral light of the auxiliary light non-emission condition;

a white balance (WB) correction step for setting, by performing a first tint correction on an image data obtained in the image pickup operation performed in the auxiliary light non-emission condition and based on the light source characteristic and the first tint correction coefficient, a target color based on stored image data;

a second tint correction coefficient setting step for setting a second tint correction coefficient on the basis of: (a) the target color and the light source characteristic of an image pickup operation performed in an auxiliary light emission condition, (b) a first average chromaticity value of a predetermined region in an image data having the target color, wherein the image data associated with the first average chromaticity value is obtained in the image pickup operation performed in the auxiliary light non-emission condition, and (c) a second average chromaticity value of the predetermined region in an image data obtained in the image pickup operation performed in the auxiliary light emission condition, wherein the second tint correction coefficient is for correcting the tint of an image captured in the auxiliary light emission condition to the tint of the auxiliary light non-emission condition; and an image processing step for generating an image having the tint of the auxiliary light non-emission condition on the basis of the first tint correction coefficient and the second tint correction coefficient when the image pickup operation is performed in the auxiliary light emission condition.

* * * * *